(12) United States Patent
Kim et al.

(10) Patent No.: US 10,863,181 B2
(45) Date of Patent: Dec. 8, 2020

(54) METHOD AND DEVICE FOR SHARING A CANDIDATE LIST

(71) Applicants: Electronics and Telecommunications Research Institute, Daejeon (KR); UNIVERSITY-INDUSTRY COOPERATION GROUP OF KYUNG HEE UNIVERSITY, Yongin-si (KR)

(72) Inventors: Hui Yong Kim, Daejeon (KR); Gwang Hoon Park, Seongnam-si (KR); Kyung Yong Kim, Suwon-si (KR); Sang Min Kim, Yongin-si (KR); Sung Chang Lim, Daejeon (KR); Jin Ho Lee, Daejeon (KR); Jin Soo Choi, Daejeon (KR); Jin Woong Kim, Daejeon (KR)

(73) Assignees: Electronics and Telecommunications Research Institute, Daejeon (KR); UNIVERSITY-INDUSTRY COOPERATION GROUP OF KYUNG HEE UNIVERSITY, Yongin-si (KR)

( * ) Notice: Subject to any disclaimer, the term of this patent is extended or adjusted under 35 U.S.C. 154(b) by 0 days.

(21) Appl. No.: 15/930,778

(22) Filed: May 13, 2020

(65) Prior Publication Data
US 2020/0275106 A1   Aug. 27, 2020

Related U.S. Application Data

(63) Continuation of application No. 16/695,666, filed on Nov. 26, 2019, which is a continuation of application
(Continued)

(30) Foreign Application Priority Data

Nov. 8, 2011 (KR) .................. 10-2011-0115607
Nov. 9, 2011 (KR) .................. 10-2011-0116527
(Continued)

(51) Int. Cl.
*H04N 19/00*   (2014.01)
*H04N 19/159*   (2014.01)
(Continued)

(52) U.S. Cl.
CPC ......... *H04N 19/159* (2014.11); *H04N 19/105* (2014.11); *H04N 19/117* (2014.11);
(Continued)

(58) Field of Classification Search
CPC ..... H04N 19/503; H04N 19/52; H04N 19/593
(Continued)

(56) References Cited

U.S. PATENT DOCUMENTS 8,739,559 B2   6/2014   Thomas et al.
9,139,633 B2   9/2015   Johnson et al.
(Continued)

FOREIGN PATENT DOCUMENTS

JP   5969041 B2   8/2016
JP   2016-165143 A   9/2016
(Continued)

OTHER PUBLICATIONS

Liu, S. et al., "Method and syntax for partial CU merge," 5th Meeting on Joint Collaborative Team on Video Coding (JCT-VC) held in Geneva, Switzerland, Mar. 16-23, 2011 (5 pages).
(Continued)

*Primary Examiner* — Jeffery A Williams
(74) *Attorney, Agent, or Firm* — NSIP Law

(57) ABSTRACT

The present invention relates to a method and device for sharing a candidate list. A method of generating a merging
(Continued)

candidate list for a predictive block may include: producing, on the basis of a coding block including a predictive block on which a parallel merging process is performed, at least one of a spatial merging candidate and a temporal merging candidate of the predictive block; and generating a single merging candidate list for the coding block on the basis of the produced merging candidate. Thus, it is possible to increase processing speeds for coding and decoding by performing inter-picture prediction in parallel on a plurality of predictive blocks.

12 Claims, 23 Drawing Sheets

Related U.S. Application Data

No. 16/400,445, filed on May 1, 2019, now Pat. No. 10,536,706, which is a continuation of application No. 16/018,324, filed on Jun. 26, 2018, now Pat. No. 10,326,998, which is a continuation of application No. 15/814,030, filed on Nov. 15, 2017, now Pat. No. 10,038,907, which is a continuation of application No. 15/342,751, filed on Nov. 3, 2016, now Pat. No. 9,854,249, which is a continuation of application No. 14/353,615, filed as application No. PCT/KR2012/009427 on Nov. 8, 2012, now Pat. No. 9,516,334.

(30) Foreign Application Priority Data

| Nov. 21, 2011 | (KR) | 10-2011-0121428 |
| Nov. 28, 2011 | (KR) | 10-2011-0124813 |
| Dec. 23, 2011 | (KR) | 10-2011-0140861 |
| Feb. 3, 2012 | (KR) | 10-2012-0011412 |
| Nov. 8, 2012 | (KR) | 10-2012-0126369 |

(51) Int. Cl.
| *H04N 19/52* | (2014.01) |
| *H04N 19/436* | (2014.01) |
| *H04N 19/593* | (2014.01) |
| *H04N 19/503* | (2014.01) |
| *H04N 19/105* | (2014.01) |
| *H04N 19/122* | (2014.01) |
| *H04N 19/124* | (2014.01) |
| *H04N 19/13* | (2014.01) |
| *H04N 19/15* | (2014.01) |
| *H04N 19/51* | (2014.01) |
| *H04N 19/61* | (2014.01) |
| *H04N 19/117* | (2014.01) |
| *H04N 19/176* | (2014.01) |

(52) U.S. Cl.
CPC ......... *H04N 19/122* (2014.11); *H04N 19/124* (2014.11); *H04N 19/13* (2014.11); *H04N 19/15* (2014.11); *H04N 19/436* (2014.11); *H04N 19/503* (2014.11); *H04N 19/51* (2014.11); *H04N 19/52* (2014.11); *H04N 19/593* (2014.11); *H04N 19/61* (2014.11); *H04N 19/176* (2014.11)

(58) Field of Classification Search
USPC .................................................. 375/240.12
See application file for complete search history.

(56) References Cited

U.S. PATENT DOCUMENTS

| 9,185,427 B2 | 11/2015 | Tourapis et al. |
| 2005/0053139 A1 | 3/2005 | Park |
| 2010/0166073 A1 | 7/2010 | Schmit et al. |
| 2012/0230408 A1* | 9/2012 | Zhou ............... H04N 19/105 375/240.15 |
| 2013/0036071 A1 | 2/2013 | Rouwenhorst et al. |
| 2013/0042888 A1 | 2/2013 | Zucchelli |
| 2013/0070854 A1 | 3/2013 | Wang et al. |
| 2014/0269909 A1 | 9/2014 | Oh et al. |
| 2014/0301461 A1 | 10/2014 | Jeon et al. |

FOREIGN PATENT DOCUMENTS

| JP | 2016-165144 A | 9/2016 |
| JP | 2016-165145 A | 9/2016 |
| JP | 2016-167866 A | 9/2016 |
| KR | 2003-0079872 A | 10/2003 |
| KR | 10-2007-0117432 A | 12/2007 |
| KR | 10-1039204 B1 | 6/2011 |
| KR | 10-2011-0107827 A | 10/2011 |
| KR | 10-2014-0057683 A | 5/2014 |
| RU | 2310231 C2 | 12/2004 |
| WO | WO 2010/032941 A2 | 3/2010 |
| WO | WO 2010/078212 A1 | 7/2010 |
| WO | WO 2012/177644 A1 | 12/2012 |
| WO | WO 2013/036071 A2 | 3/2013 |
| WO | WO 2013/039639 A1 | 3/2013 |
| WO | WO 2013/042888 A2 | 3/2013 |
| WO | WO 2013/067938 A1 | 5/2013 |

OTHER PUBLICATIONS

Lin, J-L et al., "CE9: Results of Experiment SP04," 6th Meeting on Joint Collaborative Team on Video Coding of ISO/IEC JTC1/SC29/WG11 held in Torino, IT on Jul. 14-22, 2011, document No. JCTVC-F050 (4 pages).

Zhou, M., "Parallelized merge/skip mode for HEVC," 6th Meeting on Joint Collaborative Team on Video Coding (JCT-VC) held in Torino, Italy, Jul. 14-22, 2011 (13 pages).

Zheng, Y. et al., "Merge Candidate Selection in 2NxN, Nx2N, and NxN Mode," 6th Meeting on Joint Collaborative Team on Video Coding (JCT-VC) of ITU-T SG16 WP3 and ISO/IEC JTC1/SC29/WG11, held in Torino, Italy on Jul. 14-22, 2011, document No. JCTVC-F302 (6 pages).

Seo, C. et al., "HEVC," The magazine of the IEEK, vol. 38, No. 8, Aug. 31, 2011 (pp. 22-26).

Jeon, Y. et al., "Non-CE9: improvement on parallelized merge/skip mode," 7th Meeting on Joint Collaborative Team on Video Coding (JCT-VC) of ITU-T SG16 WP3 and ISO/IEC JTC1/SC29/WG11, held in Geneva, Switzerland on Nov. 19-30, 2011, document No. JCTVC-G164 (7 pages).

Kim, H. et al., "CU-based Merge Candidate List Construction," 7th Meeting on Joint Collaborative Team on Video Coding of ISO/IEC JTC1/SC29/WG11, held in Geneva, CH, on Nov. 21-30, 2011 (14 pages).

Kim, H. Y. et al., "CU-based Merge Candidate List Construction," 7th Meeting on Joint Collaborative Team on Video Coding (JCT-VC) of ITU-T SG16 WP3 and ISO/IEC JTC1/SC29/WG11, held in Geneva, Switzerland on Nov. 21-30, 2011, document No. JCTVC-G416 (15 pages).

Wen, X. et al., "Parallel Merge/Skip Mode for HEVC," 7th Meeting on Joint Collaborative Team on Video Coding (JCT-VC) of ITU-T SG16 WP3 and ISO/IEC JTC1/SC29/WG11, held in Geneva, Switzerland on Nov. 21-30, 2011, document No. JCTVC-G387 (13 pages).

International Search Report dated Mar. 8, 2013 in counterpart International Application No. PCT/KR2012/009427. (5 pages including English translation).

Japanese Office Action dated Jun. 23, 2015 in counterpart Japanese Application No. 2014-540949 (8 pages, in Japanese).

Partial supplementary European search report dated Aug. 14, 2015 in counterpart European Application No. 12848248.6 (6 pages).

* cited by examiner

FIG. 3
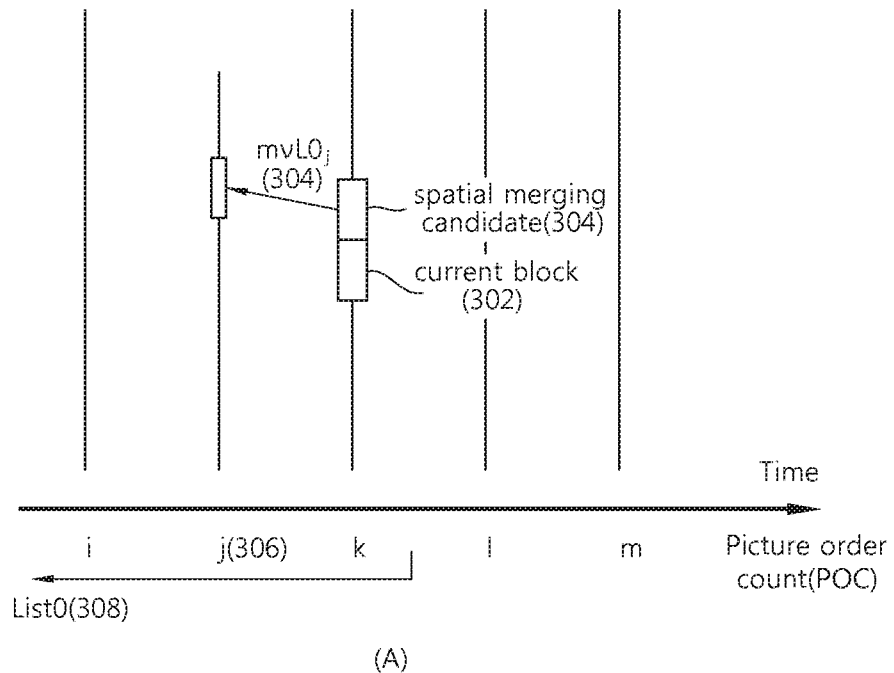
(A)
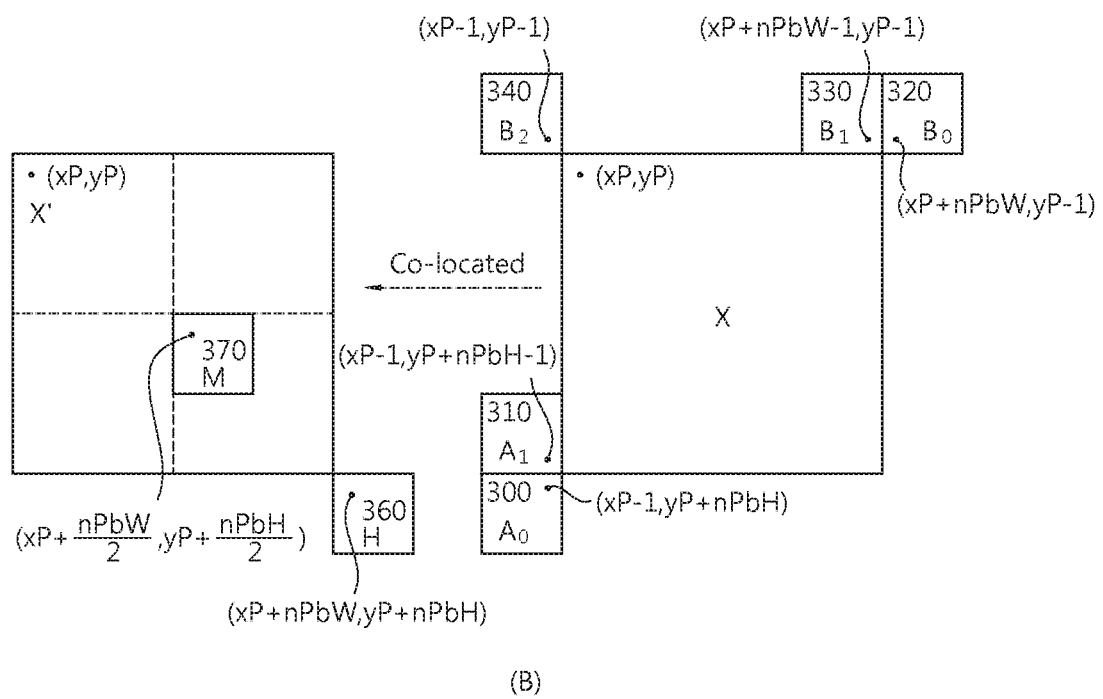
(B)

FIG. 13
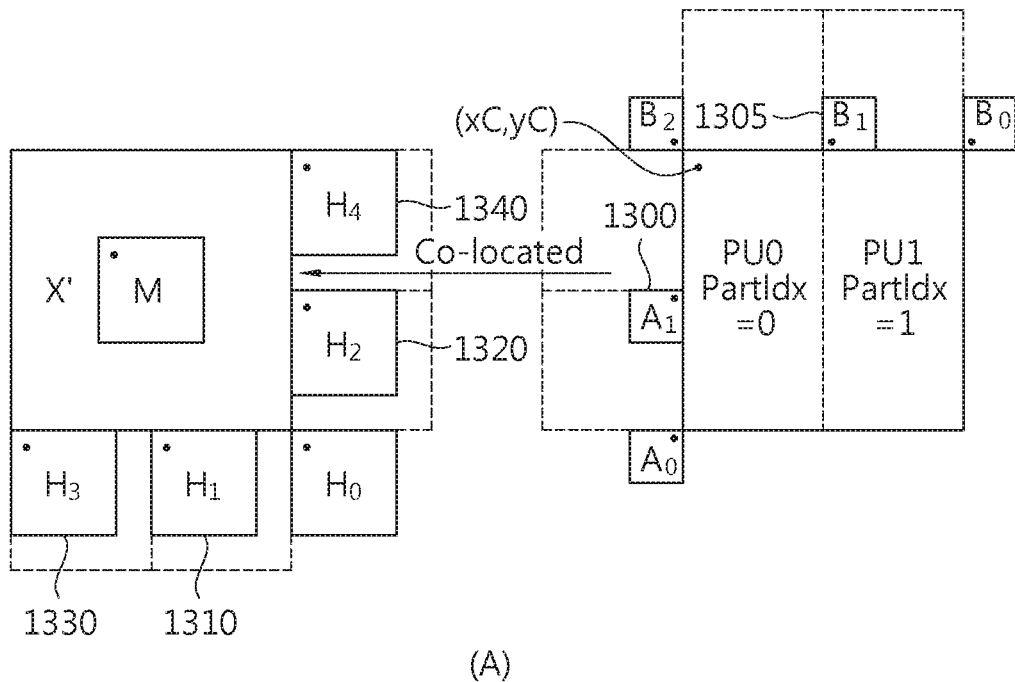
(A)
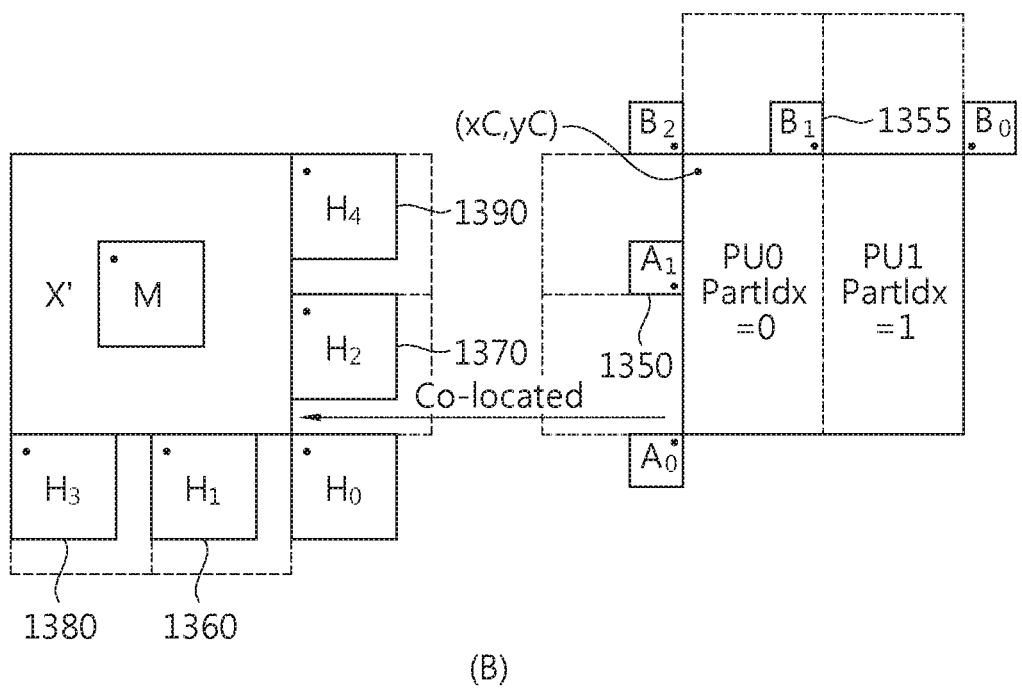
(B)

FIG. 15
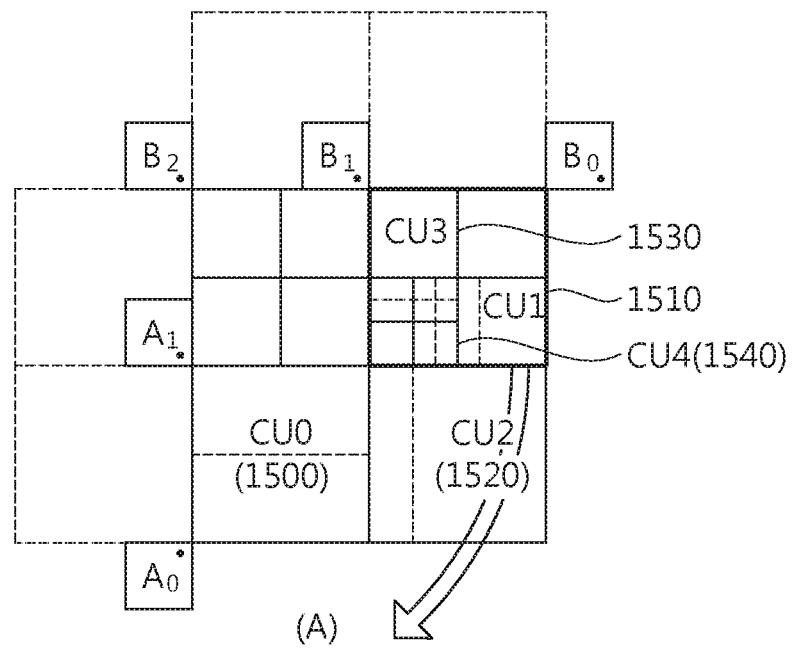
(A)
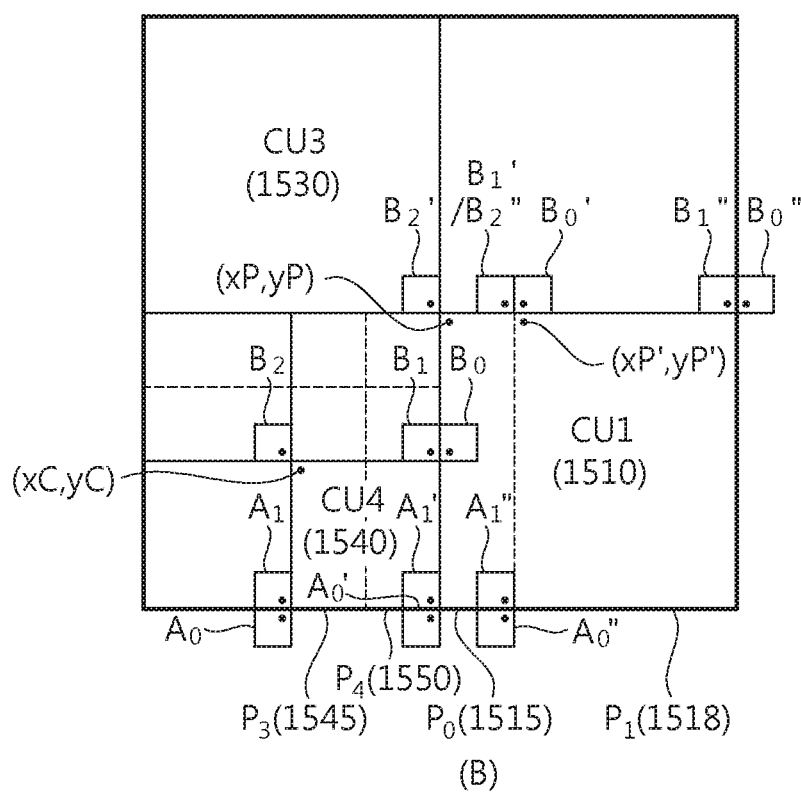
(B)

FIG. 16
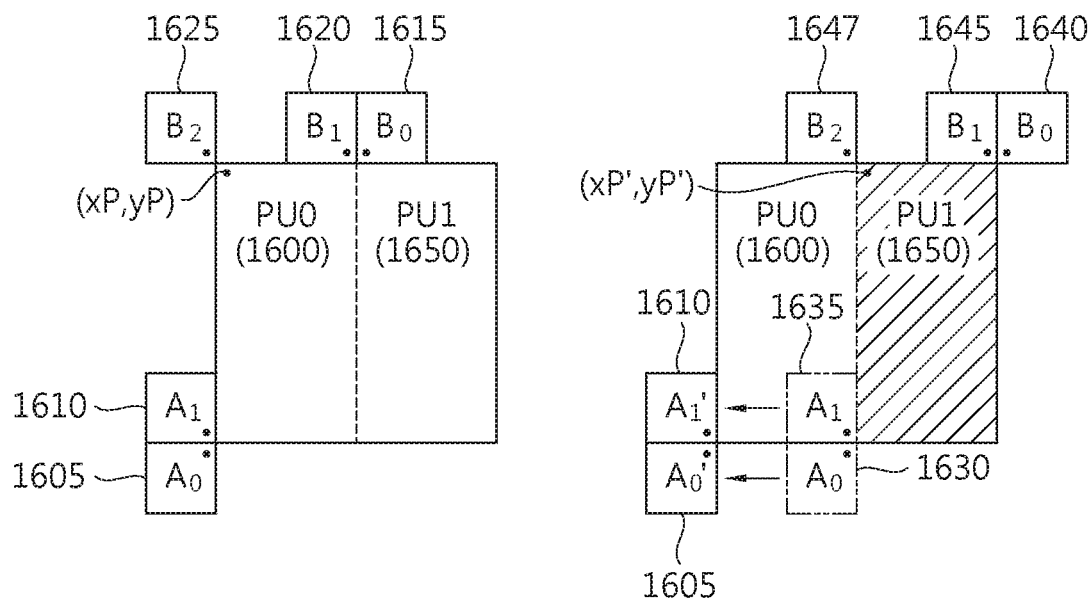
(A)
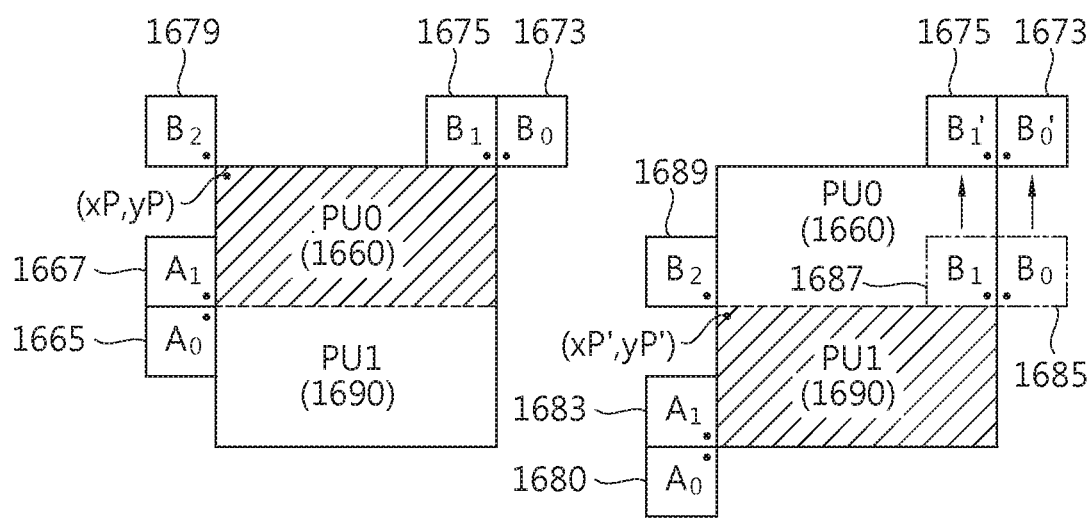
(B)

FIG. 18
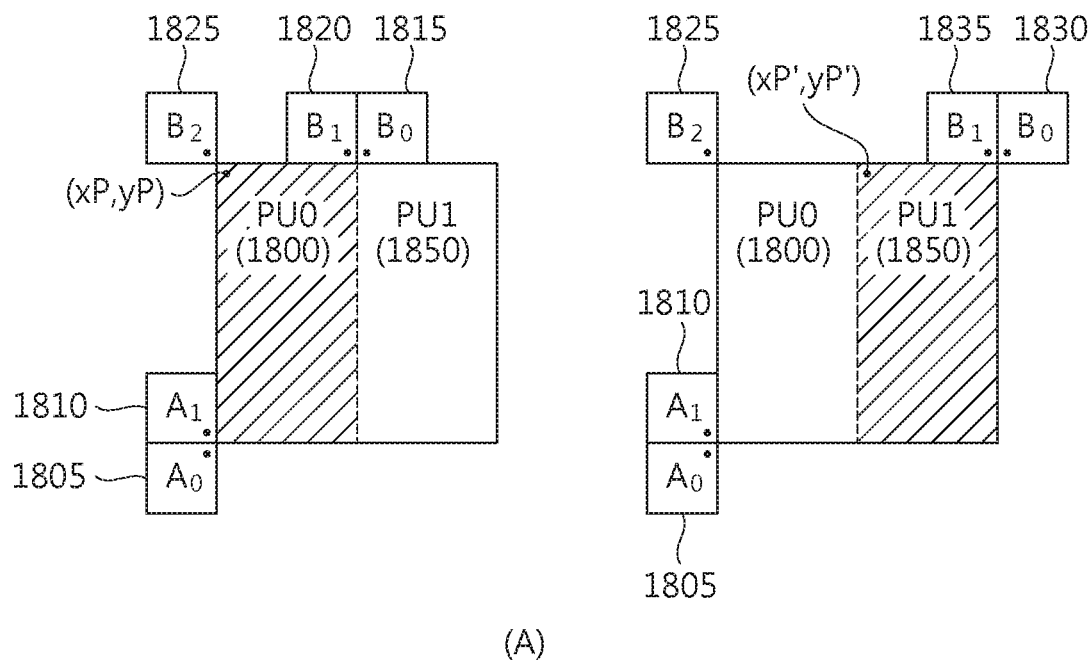
(A)
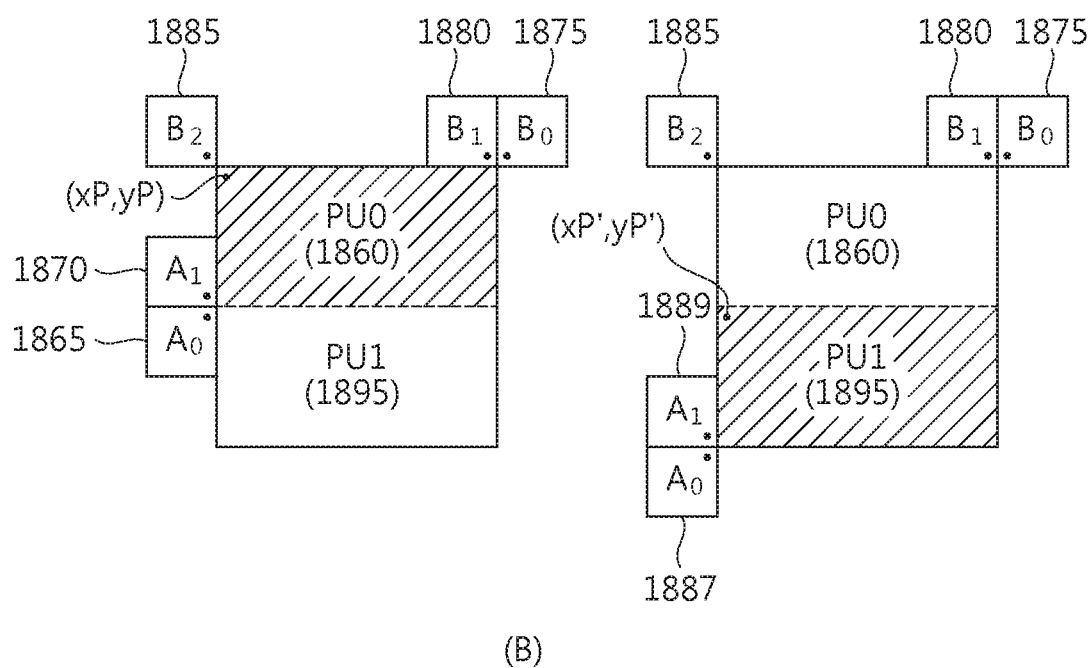
(B)

METHOD AND DEVICE FOR SHARING A CANDIDATE LIST

CROSS-REFERENCE TO RELATED APPLICATIONS

This application is a continuation of U.S. application Ser. No. 16/695,666 filed on Nov. 26, 2019, which is a continuation of U.S. application Ser. No. 16/400,445 filed on May 1, 2019, now U.S. Pat. No. 10,536,706, issued on Jan. 14, 2020, which is a continuation of U.S. application Ser. No. 16/018,324 filed on Jun. 26, 2018, now U.S. Pat. No. 10,326,998, issued on Jun. 18, 2019, which is a continuation of U.S. application Ser. No. 15/814,030 filed on Nov. 15, 2017, now U.S. Pat. No. 10,038,907, issued on Jul. 31, 2018, which is a continuation of U.S. application Ser. No. 15/342,751 filed on Nov. 3, 2016, now U.S. Pat. No. 9,854,249, issued on Dec. 26, 2017, which is a continuation of U.S. application Ser. No. 14/353,615 having a 371(c) date of Apr. 23, 2014, now U.S. Pat. No. 9,516,334, issued on Dec. 6, 2016, which is a U.S. national stage application of International Application No. PCT/KR2012/009427 filed on Nov. 8, 2012, which claims the benefit of Korean Patent Application No. 10-2011-0115607 filed on Nov. 8, 2011, Korean Patent Application No. 10-2011-0116527 filed on Nov. 9, 2011, Korean Patent Application No. 10-2011-0121428 filed on Nov. 21, 2011, Korean Patent Application No. 10-2011-0124813 filed on Nov. 28, 2011, Korean Patent Application No. 10-2011-0140861 filed on Dec. 23, 2011, Korean Patent Application No. 10-2012-0011412 filed on Feb. 3, 2012, and Korean Patent Application No. 10-2012-0126369 filed on Nov. 8, 2012, in the Korean Intellectual Property Office, the entire disclosures of which are incorporated herein by reference for all purposes.

BACKGROUND OF THE INVENTION

Field of the Invention

The present invention relates to a video processing method and an apparatus using the method and more particularly, an inter-prediction method and an apparatus using the method.

Related Art

There is growing demand for high resolution, high quality video such as HD (High Definition) and UHD (Ultra High Definition) video in a host of applications. Since the amount of data to be handled at higher resolution and/or quality is relatively large compared with the conventional video data, costs for transmission and storage are subsequently increased when video data are transmitted through the existing wired or wireless broadband lines or stored in the conventional storage media. To solve the problems caused by high resolution, high quality video data, highly efficient compression techniques may be utilized.

Current video compression techniques include an inter-prediction technique which predicts pixel values of a current video frame by using its previous or subsequent video frame, an intra-prediction technique which predicts pixel values of a current video frame by using pixel information within the current frame, an entropy encoding method which assigns a short codeword to those pixel values with high frequency and assigns a long codeword to those pixel values with low frequency, and so on. Video data can be compressed efficiently by using the video compression techniques above and subsequently transmitted or stored.

SUMMARY OF THE INVENTION

An objective of the present invention is to provide a method for carrying out inter-prediction for prediction blocks in a parallel fashion by generating a single candidate list.

Another objective of the present invention is to provide an apparatus for carrying out inter-prediction for prediction blocks in a parallel fashion by generating a single candidate list.

To achieve the objective above, a method for generating a list of merging candidates for prediction blocks according to one aspect of the present invention comprises deriving based on an coding block including the prediction block at least one merging candidate from a spatial merging candidate and a temporal merging candidate of the prediction block for which a parallel merge processing is applied; and based on the merging candidate derived, generating a single merging candidate list with respect to the coding block. The deriving based on a coding block including the prediction block at least one merging candidate from a spatial merging candidate and a temporal merging candidate of the prediction block to which parallel merge processing can be applied comprises deriving a spatial merging candidate block and a temporal merging candidate block based on pixel position and size of the coding block and deriving motion prediction-related information of an available merging candidate block from the derived spatial merging candidate block and the temporal merging candidate block as the merging candidate. The method for generating a merging candidate list for prediction blocks further comprises determining whether parallel merge processing can be applied to the prediction block; and the determining whether parallel merge processing can be applied to a prediction block comprises decoding size information of a block to which parallel merge processing can be applied and determining whether parallel merge processing can be applied to the prediction block based on size information of the block to which parallel merge processing can be applied and size information of the coding block. The deriving motion prediction-related information of an available merging candidate block from the derived spatial merging candidate block and the temporal merging candidate block as the merging candidate comprises determining whether the coding block and a spatial merging candidate block derived based on the coding block belong to the inside of the block to which parallel merge processing can be applied; and in case the coding block and the spatial merging candidate block derived based on the coding block belong to the inside of the block to which parallel merge processing can be applied, determining the spatial merging candidate block as a unavailable spatial merging candidate block. The determining whether the prediction block is to which parallel merge processing can be applied based on size information of the block to which parallel merge processing can be applied and size information of the coding block comprises determining whether the size of a block to which parallel merge processing can be applied is larger than a predetermined size, determining whether the coding block is of a particular size, and in case the size of the block to which parallel merge processing can be applied is larger than the predetermined size and the coding block is of the particular size, determining that merging is carried out for the prediction block by using the single merging candidate list. The method for generating a merging candidate list for a prediction block further comprises deriving the spatial merging candidate block and the temporal merging candidate block based on pixel position and size of the prediction block in case the prediction block is not to which parallel merge processing can be applied; and deriving motion prediction-related information of an available merging candidate block from the spatial merging candidate block and the temporal merging candidate block derived as the merging candidate. The deriving motion prediction-related information of an available merging candidate block from the spatial merging candidate block and the temporal merging candidate block derived as the merging candidate comprises determining whether the prediction block corresponds to a block divided into one of N×2N, nL×2N and nR×2N form and the prediction block corresponds to a second prediction block; and in case the prediction block corresponds to the block divided into one of N×2N, nL×2N and nR×2N form and the prediction block corresponds to a second prediction block, determining a spatial merging candidate block included in a first prediction block as a unavailable block. The deriving motion prediction-related information of an available merging candidate block from the spatial merging candidate block and the temporal merging candidate block derived as the merging candidate comprises determining whether the prediction block corresponds to a block divided into one of 2N×N, 2N×nU and 2N×nD form and the prediction block corresponds to a second prediction block; and in case the prediction block corresponds to the block divided into one of 2N×N, 2N×nU and 2N×nD form and the prediction block corresponds to the second prediction block, determining a spatial merging candidate block included in the first prediction block as a unavailable block.

To achieve the objective of the present invention above, a video decoding apparatus according to one aspect of the present invention comprises a prediction unit. The prediction unit derives based on a coding block including the prediction block at least one merging candidate from a spatial merging candidate and a temporal merging candidate of the prediction block to which a parallel merge process can be applied; and based on the merging candidate derived, generates a single merging candidate list with respect to the coding block. To derive based on a coding block including the prediction block at least one merging candidate from a spatial merging candidate and a temporal merging candidate of the prediction block to which parallel merge processing can be applied, the prediction unit derives a spatial merging candidate block and a temporal merging candidate block based on pixel position and size of the coding block and derives motion prediction-related information of an available merging candidate block from the derived spatial merging candidate block and the temporal merging candidate block as the merging candidate. The prediction unit determines whether parallel merge processing can be applied to the prediction block; and to determine whether parallel merge processing can be applied to the prediction block, determines based on size information of a decoded block to which parallel merge processing can be applied and size information of the coding block whether parallel merge processing can be applied to the prediction block. The prediction unit, to derive motion prediction-related information of an available merging candidate block from the spatial merging candidate block and the temporal merging candidate block derived as the merging candidate, determines whether the coding block and a spatial merging candidate block derived based on the coding block belong to the inside of the block to which parallel merge processing can be applied; and in case the coding block and the spatial merging candidate block derived based on the coding block belong to the inside of the block to which parallel merge processing can be applied, determines the spatial merging candidate block as a unavailable spatial merging candidate block. To determine whether parallel merge processing can be applied to the prediction unit based on size information of the block to which parallel merge processing can be applied and size information of the coding block, the prediction unit determines whether the size of a block to which parallel merge processing can be applied is larger than a predetermined size, determines whether the coding block is of a particular size, and in case the size of the block to which parallel merge processing can be applied is larger than the predetermined size and the coding block is of the particular size, determines that merging is carried out for the prediction block by using the single merging candidate list. The prediction unit derives the spatial merging candidate block and the temporal merging candidate block based on pixel position and size of the prediction block in case parallel merge processing cannot be applied to the prediction block; and derives motion prediction-related information of an available merging candidate block from the derived spatial merging candidate block and the temporal merging candidate block as the merging candidate. To derive motion prediction-related information of an available merging candidate block from the spatial merging candidate block and the temporal merging candidate block derived as the merging candidate, the prediction unit determines whether the prediction block corresponds to a block divided into one of N×2N, nL×2N and nR×2N form and the prediction block corresponds to a second prediction block; and in case the prediction block corresponds to the block divided into one of N×2N, nL×2N and nR×2N form and the prediction block corresponds to a second prediction block, determines a spatial merging candidate block included in a first prediction block as a unavailable block. To derive motion prediction-related information of an available merging candidate block from the spatial merging candidate block and the temporal merging candidate block derived as the merging candidate, the prediction unit determines whether the prediction block corresponds to a block divided into one of 2N×N, 2N×nU and 2N×nD form and the prediction block corresponds to a second prediction block; and in case the prediction block corresponds to the block divided into one of 2N×N, 2N×nU and 2N×nD form and the prediction block corresponds to the second prediction block, determines a spatial merging candidate block included in the first prediction block as a unavailable block.

According to a method for sharing a candidate list and an apparatus using the method according to an embodiment of the present invention, complexity due to inter-prediction is lowered as the inter-prediction is carried out while a single candidate list is shared among a plurality of prediction blocks divided from one coding block. Also, since inter-prediction is carried out in a parallel fashion for a plurality of prediction blocks, processing speed of encoding and decoding can be improved.

BRIEF DESCRIPTION OF THE DRAWINGS

FIG. 3 is a conceptual drawing illustrating a method for inter-prediction using merging according to an embodiment of the present invention.

FIG. 13 is a conceptual drawing illustrating a method for generating a single merging candidate list according to an embodiment of the present invention.

FIG. 15 is a conceptual drawing illustrating a method for generating a single merging candidate list according to an embodiment of the present invention.

FIG. 16 is a conceptual drawing illustrating a method for generating a merging candidate list according to an embodiment of the present invention.

FIG. 18 is a conceptual drawing illustrating a method for generating a merging candidate list according to an embodiment of the present invention.

DESCRIPTION OF EXEMPLARY EMBODIMENTS

In what follows, preferred embodiments according to the present invention will be described with reference to appended drawings. In describing embodiments of the present invention, if it is determined that specific descriptions about related structure of functions will-known to the public may mislead the technical principles of the present invention, the corresponding descriptions will be omitted.

If some constituting element is mentioned to be "linked" or "connected" to another constituting element, the element may be linked or connected to the another element directly but it should be understood that another element may exist between the two elements. Also, what is meant to be "included" in the present invention should be understood that it does not exclude other components other than those explicitly included in the document and additional structure can be included in an embodiment or technical scope of the present invention.

The terms of first, second, and the like can be used to describe various constituting elements but the constituting elements should not be limited by the terms. Rather, the terms are used only for distinguishing one constituting element from the others. For example, a first constituting element can be called a second constituting element without departing the scope of claims of the present invention and vice versa.

Meanwhile, constituting units in the embodiments of the present invention are illustrated independently to describe characteristic functions different from each other and thus do not indicate that each constituting unit comprises separate units of hardware or software. In other words, each constituting unit is described as such for the convenience of description; thus, at least two constituting units may from a single unit and at the same time, a single unit may provide an intended function while it is divided into multiple sub-units and an integrated embodiment of individual units and embodiments performed by sub-units all should be understood to belong to the claims of the present invention as long as those embodiments belong to the technical scope of the present invention.

In addition, some of constituting elements are not crucial for carrying out fundamental functions of the present invention; instead they may have been introduced optionally to improve the performance of the functions. The present invention can be implemented by using only those elements essential to realize the technical principles of the present invention without employing the optional elements used for performance enhancement. It should be understood that configurations comprising only those essential elements excluding the optional ones used only for performance enhancement still belong to the technical scope of the present invention.

Figure 1:
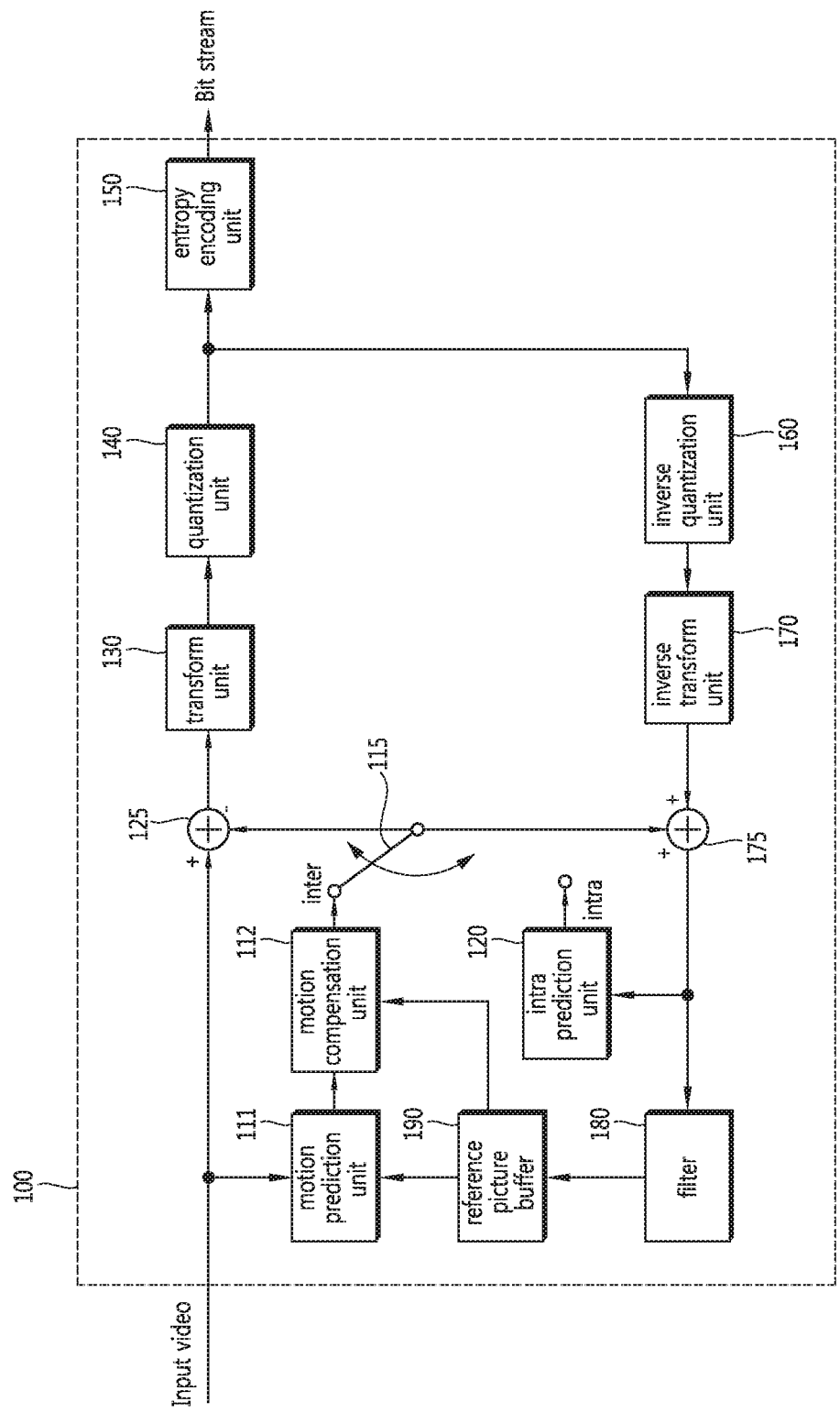
FIG. 1 is a block diagram illustrating the structure of a video encoding apparatus according to one embodiment of the present invention.

FIG. 1 is a block diagram illustrating the structure of a video encoding apparatus according to one embodiment of the present invention.

With reference to FIG. 1, the video encoding apparatus 100 comprises a motion prediction unit 111, a motion compensation unit 112, an intra-prediction unit 120, a switch 115, a subtraction unit 125, a transform unit 130, a quantization unit 140, an entropy encoding unit 150, an inverse quantization unit 160, an inverse transform unit 170, an adder 175, a filter 180, and a reference picture buffer 190.

The video encoding apparatus 100 carries out encoding an input video in an intra or inter mode and produces a bit stream. In case of an intra mode, the switch 115 switches to intra while in case on an inter mode, the switch 115 switches to inter. The video encoding apparatus 100, after deriving a prediction block with respect to an input block, encodes the residual between the input and the prediction block.

An intra mode is defined as an in-picture prediction mode while an inter mode is defined as an inter-picture prediction mode; an intra prediction unit 120 may be called an in-picture prediction unit while a motion prediction unit 111 and a motion compensation unit 112 an inter-picture prediction unit.

In case of intra mode, the intra prediction unit 120 carries out spatial prediction by using pixel values of a pre-encoded block around a current block and derives a prediction block.

In case of inter mode, the motion prediction unit 111 can obtain a motion vector by searching a reference frame stored in a reference picture buffer 190 for an area most matches with an input block during a motion prediction process. The motion compensation unit 112 can derive a prediction block by carrying out motion compensation by using the motion vector.

The subtraction unit 125 derives a residual block based on a residue between an input block and a derived prediction block. The transform unit 130 produces transform coefficients by carrying out transformation of the residual block. Here, the transform coefficients imply coefficient values obtained by applying transformation to the residual block and/or a residual signal. For the following part of this document, quantized transform coefficient levels, derived by applying quantization to transform coefficients, can also be called transform coefficients.

The quantization unit 140 quantizes input transform coefficients according to quantization coefficients and outputs quantized transform coefficient levels.

The entropy encoding unit 150 carries out entropy encoding based on the values derived by the quantization unit 140 or encoding parameters derived through an encoding process; and outputs a bit stream.

In case of entropy encoding a small number of bits are assigned to a symbol with a high probability of occurrence whereas a large number of bits are assigned to the symbol with a low probability of occurrence, thereby reducing the size of a bit stream for symbols to be encoded. Therefore, compression performance of video encoding can be enhanced through entropy encoding. The entropy encoding unit 150 can utilize encoding method such as exponential golomb, CAVLC (Context-Adaptive Variable Length Coding), CABAC (Context-Adaptive Binary Arithmetic Coding), and so on for entropy encoding.

Since the video encoding apparatus according to the embodiment of FIG. 1 carries out inter prediction encoding, namely inter-frame prediction encoding, it is necessary for a currently encoded frame to be decoded and stored so that it can be used as a reference frame. Therefore, quantized coefficients are inversely quantized by the inverse quantization unit 160 and inversely transformed by the inverse transform unit 170. The inversely quantized, transformed coefficients are added to a prediction block through the adder 175 and a reconstructed block is obtained.

The reconstructed block passes through the filter 180 and the filter 180 can apply at least one or more of a deblocking filter, SAO (Sample Adaptive Offset), and ALF (Adaptive Loop Filter) to the reconstructed block or a reconstructed picture. The reconstructed block which has passed through the filter 180 can be stored in the reference picture buffer 190.

Figure 2:
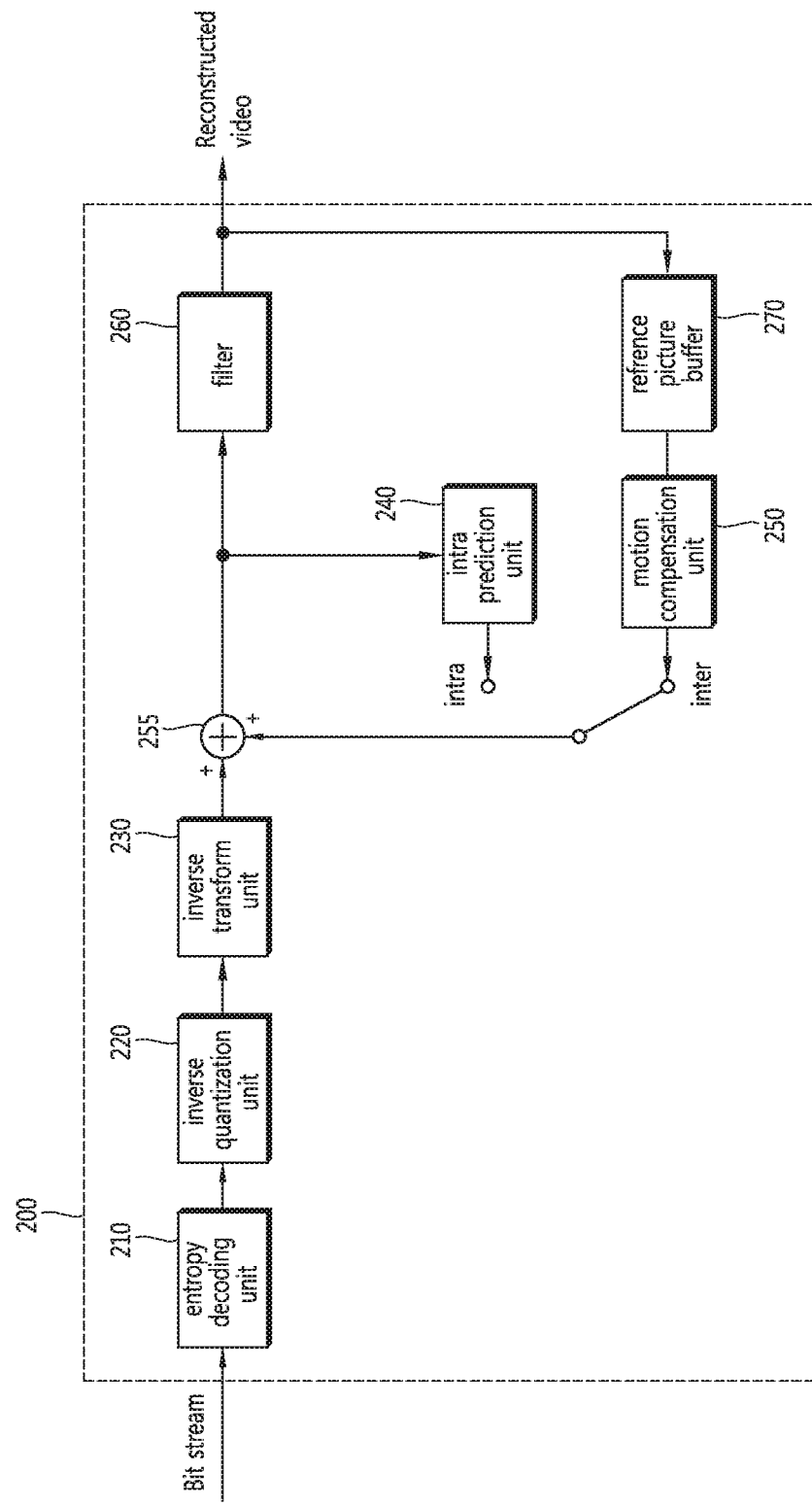
FIG. 2 is a block diagram illustrating the structure of a video decoding apparatus according to another embodiment of the present invention.

FIG. 2 is a block diagram illustrating the structure of a video decoding apparatus according to another embodiment of the present invention.

With reference to FIG. 2, the video decoding apparatus 200 comprises an entropy decoding unit 210, an inverse quantization unit 220, an inverse transform unit 230, an intra prediction unit 240, a motion compensation unit 250, an adder 255, a filter 260, and a reference picture buffer 270.

The video decoding apparatus 200 receives a bit stream output from an encoder and carries out decoding in an intra or inter mode and produces a reconfigured video, namely reconstructed video. In case of an intra mode, the switch switches to intra while in case of an inter mode, the switch switches to inter. The video decoding apparatus 200 obtains a reconstructed residual block from an input bit stream and derives a prediction block and produces a reconfigured block, namely a reconstructed block by adding the residual block and the prediction block.

The entropy decoding unit 210 applies entropy decoding to the input bit stream according to a probability distribution and produces symbols in the form of quantized coefficients. An entropy decoding method is similar to the entropy encoding method described above.

In case an entropy decoding method is applied, a small number of bits are assigned to a symbol with a high probability of occurrence while a large number of bits are assigned to a symbol with a low probability of occurrence, thereby reducing the size of a bit stream for each symbol. Therefore, compression performance of video decoding can be enhanced through an entropy decoding method.

Quantized coefficients are inversely quantized by the inverse quantization unit 220 and inversely transformed by the inverse transform unit 230; a reconstructed residual block is obtained as quantized coefficients are inversely quantized/inversely transformed.

In case of an intra mode, the intra prediction unit 240 obtains a prediction block by carrying out spatial prediction by using pixel values of a pre-decoded block around a current block. In case of an inter mode, the motion compensation unit 250 obtains a prediction unit by carrying out motion compensation by using a motion vector and a reference frame stored in the reference picture buffer 270.

The reconstructed residual block and the prediction block are added together by the adder 255 and the added block is passed through the filter 260. The filter 260 applies at least one or more of a deblocking filter, SAO, and ALF to the reconstructed block or picture. The filter 260 outputs a reconfigured frame, namely, a reconstructed frame. The reconstructed frame is stored in the reference picture buffer 270 and used for inter prediction.

Methods for improving prediction performance of an encoding/decoding apparatus include a method of increasing accuracy of an interpolated video frame and a method of predicting a difference signal. In the present invention, a "difference signal" can be substituted by a "residual block" or "difference block" depending on the context and it should be understood by those skilled in the art that the terminologies can be differentiated from each other without influencing on the technical principles of the present invention.

In the embodiments of the present invention, a coding unit (CU), a prediction unit (PU), or a transform unit (TU) is used to refer to the unit of processing a video frame.

A coding unit is a video processing unit with which encoding/decoding is carried out and includes an coding block which is a block-wise set of brightness samples or chrominance samples to which encoding/decoding is applied and information used for encoding or decoding samples of the coding block.

A prediction unit is a video processing unit with which prediction is carried out and includes a prediction block which is a block-wise set of brightness samples or chrominance samples to which prediction is performed and information used for predicting samples of the prediction block. The coding block can be divided into a plurality of prediction blocks.

A transform unit is a video processing unit with which transformation is carried out and includes a transform block which is a block-wise set of brightness samples or chrominance samples to which transformation is applied and information used for transforming samples of the transform block. The coding block can be divided into a plurality of transform blocks.

In what follows, unless otherwise explicitly stated, a block and a unit are interpreted to have the same meaning as each other.

Also, a current block refers to a block for which a particular video processing is carried out such as a prediction block for which prediction is currently carried out or a coding block for which encoding is currently carried out. For example, in case one coding block is divided into two prediction blocks, one of the two blocks for which prediction is carried out can be called a current block.

A video encoding method and a video decoding method to be described later in an embodiment of the present invention can be carried out in the individual units included in the video encoder and the video decoder described above in FIGS. 1 and 2. Each of the individual units may include a software-processing unit which can be carried out by an algorithm as well as a hardware-based processing unit.

In the following, a method for generating a merging candidate list descried in an embodiment of the present invention can be utilized both for a SKIP mode in a video processing method and merging which is one of inter-prediction methods. The SKIP mode is a video processing method which outputs a block predicted based on motion prediction information derived from a neighboring block as a reconstruction block without generating a residual block. The merging, which is one of inter-prediction methods, is a video processing method which is equivalent to the SKIP mode in a sense that a predicted block is generated based on motion prediction information derived from a neighboring block but produces a reconstruction block from a residual block and a prediction block by additionally encoding and decoding residual block information. An in-loop filtering method such as deblocking filtering and sample-adaptive offset can be applied additionally to the reconstruction block produced.

FIG. 3 is a conceptual drawing illustrating a method for inter-prediction using merging according to an embodiment of the present invention.

With reference to FIG. 3, inter prediction based on merging is carried out as described below.

Inter prediction based on merging refers to a method of carrying out inter prediction deriving merging candidates from neighboring blocks around a current block and carrying out inter prediction by using the merging candidates. Neighboring blocks used for deriving merging candidates can be classified into those blocks adjacent to a current block while belonging to the same picture as the current block and those blocks belonging to a different picture from the current block but co-located with the current block.

In the following of the present invention, a spatial merging candidate block is defined as a block among neighboring blocks used for deriving merging candidates, which is adjacent to a current block and belongs to the same picture as the current block. Meanwhile, motion prediction-related information derived from a spatial merging candidate block is called a spatial merging candidate A temporal merging candidate block is defined as a block among neighboring blocks used for deriving merging candidates, which is co-located with the current block but belongs to a different picture from the current block. Motion prediction-related information derived from a temporal merging candidate block is called a temporal merging candidate.

In other words, an inter prediction method using merging can be described as an inter prediction method which predicts a current block by using motion prediction-related information of a spatial merging candidate block (spatial merging candidate) or motion prediction-related information of a temporal merging candidate block (temporal merging candidate) to be described later.

Motion vector (mvL0/L1), reference picture index (refIdx L0/L1), and reference picture list utilization information (predFlagL0/L1) may be used for motion prediction-related information. FIG. 3A illustrates Motion vector (mvL0/L1), reference picture index (refIdxL0/L1), and reference picture list utilization information (predFlagL0/L1).

The motion vector 304 provides directivity information and used for a prediction block to derive pixel information related to a particular position of a reference picture while inter prediction is carried out. In case inter prediction is carried out in a prediction block by using a plurality of directivity information, a motion vector for each direction can be represented by using mvL0 and mvL1.

The reference picture index 306 provides index information about a reference picture for a prediction block to carry out inter prediction. In case inter prediction is carried out by using a plurality of reference pictures, each reference picture used can be indexed by using the reference picture index refIdxL0 and refIdxL1.

The reference picture list utilization information indicates which reference picture list 308 a reference picture has been derived from. For example, i, j, k picture can be stored in a reference picture list 0 308. In case there are two lists in which a reference picture is stored, information indicating a reference picture list from which the reference picture is derived can be represented by predFlagL0 and predFlagL1.

In order to carry out an inter prediction method by using merging, first of all, a spatial merging candidate is obtained through the step (1) below. FIG. 3B illustrates a spatial merging candidate and a temporal merging candidate.

(1) A spatial merging candidate is derived from blocks adjacent to a current block (a prediction target block).

As described above, a spatial merging candidate provides motion prediction-related information derived from a spatial merging candidate block. The spatial merging candidate block can be derived with respect to the position of a current block.

With reference to FIG. 3B, existing spatial merging candidate blocks 300, 310, 320, 330, 340 are derived with respect to a prediction block. Suppose the position of a pixel located in the top-left of the prediction block is (xP, yP); width of the prediction block nPbW; height of the prediction block nPbH; and MinPbSize represents the size of the smallest prediction block. Then, in the following of the present invention, a spatial merging candidate block of the prediction block describes a block containing a pixel at (xP−1, yP+nPbH) as a left first block (or A0 block, 300); a block containing a pixel at (xP−1, yP+nPbH−1) as a left second block (or A1 block, 310); a block containing a pixel at (xP+nPbW, yP−1) as a top first block (or B0 block, 320); a block containing a pixel at (xP+nPbW−1, yP−1) as a top second block (or B1 block, 330); and a block containing a pixel at (xp_1, yP−1) as a top third block (or B2 block, 340). Instead of using 1 as an index, a different value, for example, "MinPbSize" can be used and in this case, too, blocks at the same physical position can be indexed. Coordinates used for specifying the blocks at particular position are chosen arbitrarily and the same blocks can be specified by using various other expressions.

The positions and the number of the spatial merging candidate blocks 300, 310, 320, 330, 340 and the positions and the number of the temporal merging candidate blocks 360, 370 described in FIG. 3 are arbitrary; therefore, the positions and the number of the spatial merging candidate blocks and the positions and the number of the temporal merging candidate blocks can vary as long as they do not leave the technical scope of the present invention. Also, the order of merging candidate blocks to be scanned at the time of constructing a merging candidate list can be changed. In other words, in what follows, positions, the number, a scan order, a candidate prediction group of candidate prediction blocks used at the time of constructing a candidate prediction motion vector list described in an embodiment of the present invention are only an example, which can be changed as long as they fall within the technical scope of the present invention.

Availability of a spatial merging candidate block 300, 310, 320, 330, 340 is determined and from the available spatial merging candidate block, a spatial merging candidate can be derived. Availability information provides the information indicating whether a spatial merging candidate can be derived from a spatial merging candidate. For example, in case a spatial merging candidate block is located outside of a slice, a tile, or a picture to which a current block belongs or intra prediction has been carried out for the spatial merging candidate block, a spatial merging candidate, which is motion prediction-related information, cannot be derived; in this case, it may be determined that a spatial merging candidate block is not available. Various methods can be used to determine availability information of a spatial merging candidate. Additional descriptions will be provided for such an embodiment.

Motion prediction-related information can be derived for an available spatial merging candidate block and used for predicting a current block.

One coding block can be divided into at least one prediction block. In other words, a coding block may include one or more prediction blocks. In case more than one prediction block is included in a coding block, a prediction block can be indexed by particular index information. For example, if one coding block is divided into two prediction blocks, the two prediction blocks can be indexed by assigning a partition index 0 to one of the blocks while assigning a partition index 1 to the other block. Different terms can be used in such a way that the block of partition index 0 is termed a first prediction block while the block of partition index 1 is termed a second prediction block. If one coding block is further divided into additional prediction blocks, the index value specifying the prediction blocks can be increased accordingly. The terms defined for specifying prediction blocks are arbitrarily chosen; therefore, they can be utilized or interpreted in a different way.

The partition index of a prediction block can be used as information for describing an order of video processing such as encoding or decoding carried out by the prediction block. Also, in the following, a method for sharing a single candidate list according to an embodiment of the present invention describes a parallel merge process by newly defining a block to which parallel merge processing can be applied. A block to which parallel merge processing can be applied can be defined as a unit including at least one coding block or a plurality of prediction blocks, which will be described additionally in the following.

Figure 4:
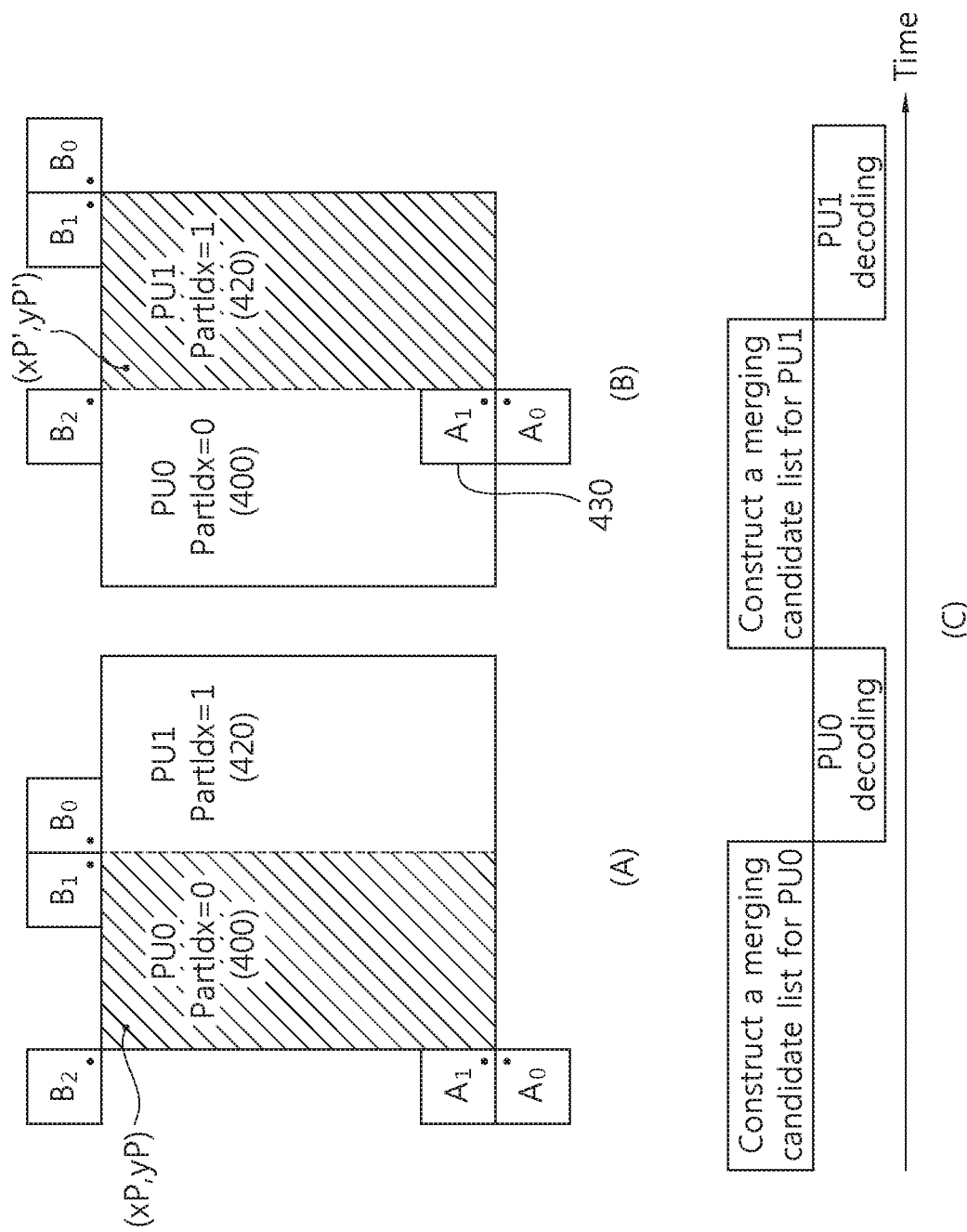
FIG. 4 is a conceptual drawing illustrating a case where one coding block is divided into two prediction blocks.

In case of deriving a spatial merging candidate for each prediction block, if one coding block is divided into two prediction blocks, a spatial merging candidate has to be derived for each block. In this case, a spatial merging candidate for the other prediction block has to wait to be derived until encoding or decoding of one prediction block included in one coding block is completed. This is because some spatial merging candidate block 310 is included in another prediction block and is allowed to derive a spatial merging candidate block only when the corresponding prediction block finishes encoding or decoding and another spatial merging candidate block 300 located at some position has not carried out encoding or decoding yet. In other words, in case of a coding block including a plurality of prediction units, encoding or decoding for each of prediction blocks cannot be carried out in a parallel fashion. FIG. 4 illustrates the aforementioned problem in more detail.

FIG. 4 is a conceptual drawing illustrating a case where one coding block is divided into two prediction blocks.

With reference to FIG. 4, one coding block is divided into a first prediction block 400 and a second prediction block 420, both of which have an N×2N form. A spatial merging candidate of the first prediction block 400 is derived based on the position of the first prediction block as shown in FIG. 4A while a spatial merging candidate block of a second prediction block 420 is derived based on the position of the second prediction block 420 as shown in FIG. 4B. Although temporal merging candidate blocks are not shown, the temporal merging candidate is derived based on the position of each prediction block.

The spatial merging candidate block of the first prediction block 400 is the one located outside of the first prediction block 400 and is positioned where encoding or decoding is already completed.

However, A1 block 430 from among spatial merging candidate blocks of the second prediction block 420 belongs to the inside of the first prediction block 400. Therefore, after prediction of the first prediction block 400 is carried out, motion prediction-related information of the A1 block 430 can be known. In other words, a procedure of generating a merging candidate list of the second prediction block 420 is carried out after a merging candidate list of the first prediction block 400 is generated.

FIG. 4C illustrates an order of generating a merging candidate list when one coding block is divided into two prediction blocks.

With reference to FIG. 4C, in case one coding block is divided into a plurality of prediction blocks during an encoding or decoding process, a process of generating a merging candidate list about a plurality of prediction blocks cannot be carried out in a parallel fashion but a process of generating a merging candidate list about a plurality of prediction blocks can be carried out sequentially for each of prediction blocks instead.

A method for sharing a candidate list and an apparatus using the method according to an embodiment of the present invention describes a method for a plurality of prediction units divided from one coding block to share a merging candidate list in deriving a spatial and temporal merging candidate. A merging candidate list shared by a plurality of prediction units is defined by the term of single merging candidate list.

In other words, the present invention provides a method for carrying out inter prediction using a plurality of prediction blocks based on a single merging candidate list of a couple of prediction blocks included in coding blocks divided from a coding block. Complexity due to generating a merging candidate list several times for individual prediction blocks can be reduced by employing a single merging candidate list. Also, encoding or decoding of a plurality of prediction blocks divided within one coding block which carries out inter prediction by merging can be carried out in parallel.

In what follows, a method for generating a single merging candidate list will be described additionally in an embodiment of the present invention.

(2) A reference picture index of a temporal merging candidate is configured.

A temporal merging candidate provides motion prediction-related information derived from a picture containing a current block and a temporal merging candidate block belonging to another picture. A temporal merging candidate block is derived based on a block at a co-located position with respect to the position of a current block. The term of call block may also be used in the same meaning as the temporal merging candidate block.

Again with respect to FIG. 3, if a block including a pixel at (xP+nPSW, yP+nPSH) in a co-located picture of a current prediction block or a block including a pixel at (xP+nPSW, yP+nPSH) is not available with respect to a pixel position (xP, yP) within a picture including a prediction block, a temporal merging candidate block 360, 370 can serve as a block including a pixel at (xP+(nPSW>>1), yP+(nPSH>>1)). A prediction block including a pixel at (xP+nPSW, yP+nPSH) in a co-located picture is called a first temporal merging candidate block (or a first co-located block 360) while a prediction block including a pixel at (xP+(nPSW>>1), yP+(nPSH>>1)) in a co-located picture is called a second temporal merging candidate block 370. The position of a final temporal merging candidate block used for deriving a temporal merging candidate (motion prediction-related information) may correspond to the block located at a position moved a little with respect to the positions of the first 360 and the second temporal merging candidate block 370. For example, in case only part of motion prediction-related information of a prediction block belonging to the co-located picture is stored in a memory, a block located at a position moved a little with respect to the positions of the first 360 and the second temporal merging candidate block 370 can be used as a final temporal merging candidate block which derives final motion prediction-related information. In the same manner as a spatial merging candidate block, the position of a temporal merging candidate block can be changed or augmented differently from FIG. 3 and an embodiment describing the case will be described later.

The reference picture index of a temporal merging candidate provides information specifying a picture referred to for a current block to carry out inter prediction based on a motion vector (mvLXCol) derived from a temporal merging candidate.

Figure 5:
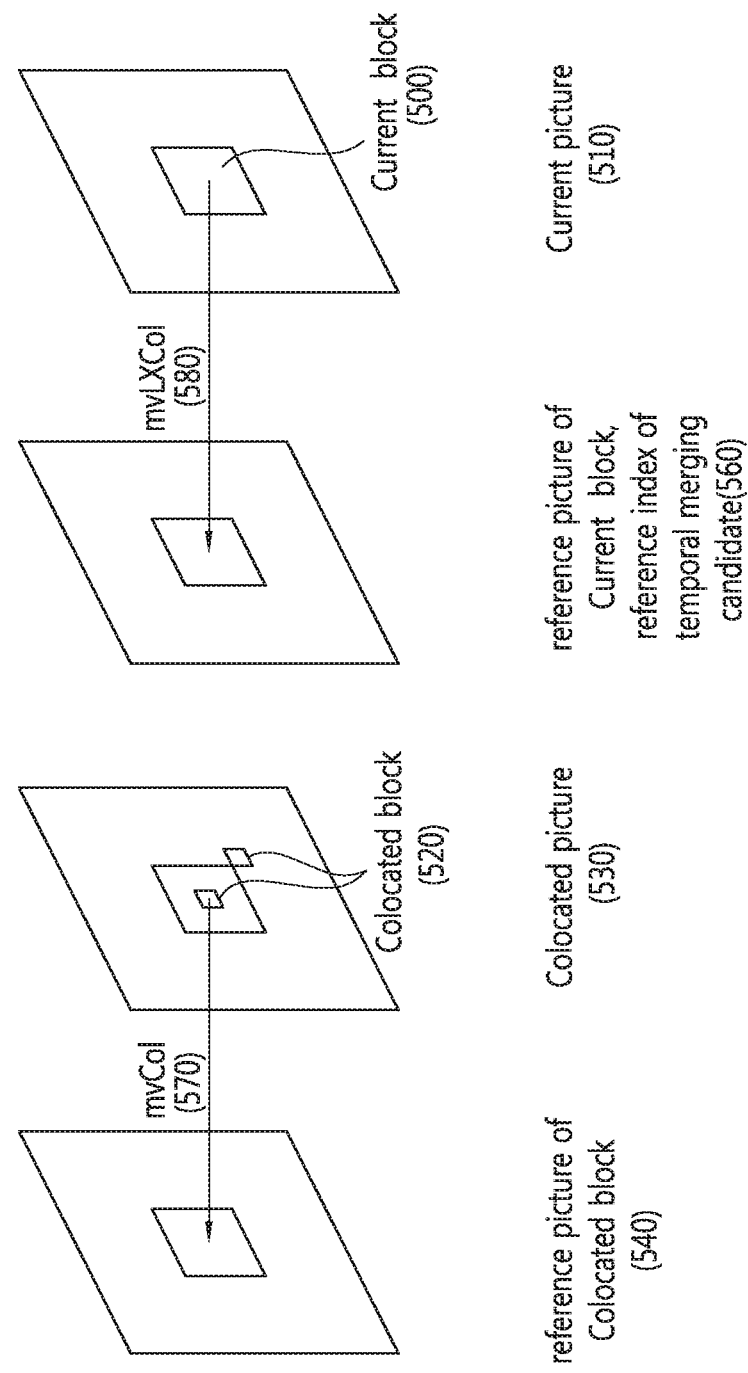
FIG. 5 is a conceptual drawing illustrating inter-prediction using a temporal merging candidate and a reference picture index of the temporal merging candidate according to an embodiment of the present invention.

FIG. 5 is a conceptual drawing illustrating inter-prediction using a temporal merging candidate and a reference picture index of the temporal merging candidate according to an embodiment of the present invention.

With reference to FIG. 5, a current block 500, a picture 510 including the current block, a temporal merging candidate block 520, and a co-located picture 530 including a call block can be defined.

With respect to the temporal merging candidate block 520, there exists a picture 540 used for the temporal merging candidate block to apply inter prediction for the temporal merging candidate block 520. Such a picture is defined as the reference picture 540 of the co-located picture 530. Also, a motion vector used for the temporal merging candidate block 520 to carry out inter prediction from the reference picture 540 of the co-located picture can be defined as mvCol 570.

With respect to the current block 500, a reference picture 560 used for inter prediction of the current block 500 based on the derived mvCol 570 has to be defined. The reference picture defined to be used for inter prediction of the current block 500 can be called a reference picture 560 of the temporal merging candidate. In other words, the reference index 560 of the temporal merging candidate is used to specify a reference picture used for temporal motion prediction of the current block 500. The step (2) derives a reference picture index of the temporal merging candidate as described above.

The motion vector mvCol 570 derived from the temporal merging candidate block 520 can be scaled and modified into another value according to the relationship of the distance between the co-located picture 530 and the reference picture 540 of the co-located picture and the distance between the picture 510 including the current block and the reference picture 560 of the temporal merging candidate derived through the step (2).

In other words, inter prediction through the temporal merging candidate of the current block 500 can be carried out through mvLXCol 580 derived through the step (3) described later, which is based on the reference picture index 560 of the temporal merging candidate derived through the step (2) and the reference picture index 560 of the temporal merging candidate. mvLXCol can be defined as a temporal motion vector.

(3) Motion prediction-related information of a temporal merging candidate is derived.

Step (3) derives a temporal merging candidate such as information about whether a temporal merging candidate block is available, reference picture list utilization information (predFlagLXCol), and motion vector information of the temporal merging candidate to carry out motion prediction based on the temporal merging candidate. The availability information of the temporal merging candidate block provides information about whether a temporal merging candidate can be derived from a temporal merging candidate block. Based on the availability information of a temporal merging candidate block, a temporal merging candidate can be included in a merging candidate list.

(4) A merging candidate list is derived.

A merging candidate list includes information about a merging candidate which can be used for inter prediction by merging based on the availability information of a merging candidate block (a spatial merging candidate block or a temporal merging candidate block). One merging candidate included in the merging candidate list can be used for predicting a current block. Information about which merging candidate is used for predicting a current block (merge index) is encoded in an encoding process and transmitted to a decoder.

The merging candidate list can be generated according to the priorities as described below.
1) A merging candidate derived from A1 block in case the A1 block is available
2) A merging candidate derived from B1 block in case the B1 block is available
3) A merging candidate derived from B0 block in case the B0 block is available
4) A merging candidate derived from A0 block in case the A0 block is available
5) A merging candidate derived from B2 block in case the B2 block is available
6) A merging candidate derived from Col block in case the Col block is available The merging candidate list may include, for example, 0 to 5 merging candidates according to the number of available blocks. In case more blocks are involved to derive merging candidates, more merging candidates can be included in the merging candidate list.

(5) Additional merging candidates are derived in case the number of merging candidates included in a merging candidate list is smaller than the maximum number of merging candidates which can be included in the merging candidate list.

An additional merging candidate may be either a merging candidate generated by combining motion prediction-related information of the existing merging candidates or a zero vector merging candidate. At this time, the zero vector merging candidate refers to the merging candidate whose motion vector is (0, 0).

(6) Among merging candidates included in a merging candidate list, a merging candidate applied for inter prediction of a current block is determined and motion prediction-related information of the merging candidate is set as the motion prediction-related information of the current block.

In a decoding process, inter prediction by merging can be carried out for a current block based on a merge index (merge_idx[xP][yP]) which is the information about which candidate is used for inter prediction of the current block from among candidates included in a merging candidate list.

Motion prediction-related information about a current block is derived through the procedures (1) to (6) described above and inter prediction about the current block is carried out by using the derived motion prediction-related information.

In what follows, an embodiment of the present invention additionally describes a method by which a parallel merge process is carried out for at least one prediction block by deriving one merging candidate list for at least one prediction block included in one coding block in using a method for deriving a spatial merging candidate from a spatial merging candidate block of a current block (a prediction target block) of step (1). In what follows, an embodiment of the present invention assumes for the convenience of description that one coding block is divided into a plurality of prediction blocks; however, the embodiment can be equally applied to the case where one coding block is not divided but the size of a coding block is equal to that of one prediction block.

The following embodiment describes a method for constructing a single merging candidate list with respect to a spatial and a temporal merging candidate. However, in the same way as the case where a merging candidate generated by combining motion prediction-related information of spatial and/or temporal merging candidates is added to a merging candidate list or a zero merging candidate is added to a merging candidate list, the method can be applied in such a way that a plurality of prediction blocks divided from one coding block uses a single merging candidate list determined based on a coding block.

To construct a single merging candidate list, a plurality of prediction blocks may share 1) both of a spatial merging candidate and a temporal merging candidate, 2) only a spatial merging candidate, or 3) only a temporal merging candidate. In the cases of 2) and 3), a merging candidate list for a prediction block may differ from each other; however, since only part of the candidates is shared, the term of single merging candidate is defined and used comprehensively for the purpose of convenience.

More specifically, a merging candidate list can be shared among prediction blocks different from each other by using:
(1) a method for generating a single merging candidate list while a plurality of prediction blocks divided from one coding block share both of a spatial and a temporal merging candidate determined based on a coding block;
(2) a method for generating a single merging candidate list while a plurality of prediction blocks divided from one coding block share only a spatial merging candidate and a temporal merging candidate uses a block derived based on each of prediction blocks; and
(3) a method for generating a single merging candidate list while a plurality of prediction blocks divided from one coding block share only a temporal merging candidate and a spatial merging candidate uses a block derived based on each of prediction blocks.

Figure 6:
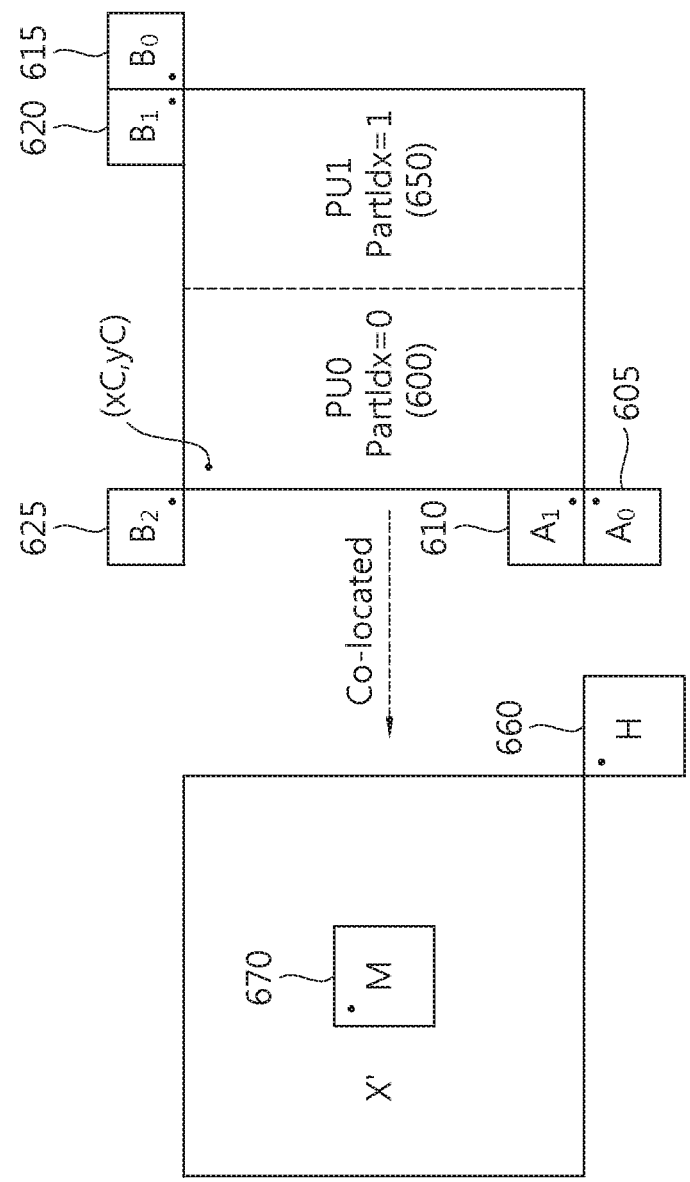
FIG. 6 is a conceptual drawing illustrating a method for generating a single merging candidate list by sharing both a spatial merging candidate and a temporal merging candidate in a plurality of prediction blocks according to an embodiment of the present invention.

FIG. 6 is a conceptual drawing illustrating a method for generating a single merging candidate list by sharing both a spatial merging candidate and a temporal merging candidate in a plurality of prediction blocks according to an embodiment of the present invention.

FIG. 6 describes a method for generating a single merging candidate list while a plurality of prediction blocks divided from one coding block share both of a spatial and a temporal merging candidate determined based on a coding block.

With reference to FIG. 6, a first prediction block 600 and a second prediction block 650 derives a spatial merging candidate from the same spatial merging candidate block and shares the spatial merging candidate. The spatial merging candidate block about the first 600 and the second prediction block 650 is determined based on a coding block and A0 block 605, A1 block 610, B0 block 615, B1 block 620, and B2 block 625 can be used as a spatial merging candidate block.

The position of each of spatial merging candidate blocks corresponds to a position including a pixel shown in the figure with respect to the top-left position (xC, yC) and size nCS of the coding block.

The A0 block 605 corresponds to a block including a pixel at (xC−1, yC+nCS); the A1 block 610 a block including a pixel at (xC−1, yC+nCS−1); the B0 block 615 a block including a pixel at (xC+nCS, yC−1); the B1 block 620 a block including a pixel at (xC+nCS−1, yC−1); the B2 block 625 a block including a pixel at (xC−1, yC−1).

Also, the first 600 and the second prediction block 650 can share a temporal merging candidate. The temporal merging candidate block 660, 670 which derives a temporal merging candidate shared by the first 600 and the second prediction block 650 can also be derived as a block located at a position derived based on the top-left position (xC, yC) and size nCS of the coding block.

For example, if a prediction block including a pixel at (xC+nCS, yC+nCS) in a co-located picture of a current prediction block or a block including a pixel at (xC+nCS, yC+nCS) is not available with respect to a pixel position (xC, yC) within a picture including a prediction block, a temporal merging candidate block 660, 670 can serve as a prediction block 670 including a pixel at (xC+(nCS>>1), yC+(nCS>>1)).

Inter prediction can be carried out by applying a parallel merge process for individual prediction blocks by using a method for deriving a single merging candidate list and it is not necessary to separately derive a merging candidate list for each of prediction blocks. Therefore, by using a single merging candidate list according to an embodiment of the present invention, a video processing speed can be enhanced for such a device as UHDTV (ultra-high definition television) which requires a significant amount of data processing.

Although the method illustrated in FIG. 6 divides a first N×2N prediction block 600 and a second N×2N prediction block 650 into blocks of N×2N form, the method can also be applied to blocks (for example, 2N×N, 2N×nU, nL×2N, nR×2N, or N×N) which are divided into prediction blocks of various other forms.

Also, the method can determine whether to apply a single merging candidate list differently according to the size or division depth of a block. For example, based on the size of a block to which parallel merge processing can be applied and size information of a coding block, information about whether a particular block uses a single merging candidate list. For example, information about whether a particular block uses a single merging candidate list can be indicated by flag information. A flag indicating whether a particular block uses a single merging candidate list is defined by singleMCLflag. For example, if singleMCflag is 0, it indicates that the corresponding block does not use a single merging candidate list while singleMCLflag is 1, it indicates that the corresponding block uses the single merging candidate list. Based on the value of singleMCLflag, a spatial merging candidate about a prediction block can be derived with respect to a coding block.

For example, based on the information that the size of a block to which parallel merge processing can be applied has to be larger than 4×4 size and the size of a current block is 8×8, flag information indicating that prediction blocks divided from an 8×8 coding block uses a single merging candidate list can be derived. The derived flag can be used later to derive a spatial merging candidate and a temporal merging candidate of a prediction block based on a coding block.

An additional description about the embodiment of the present invention above will be provided below.

Figure 7:
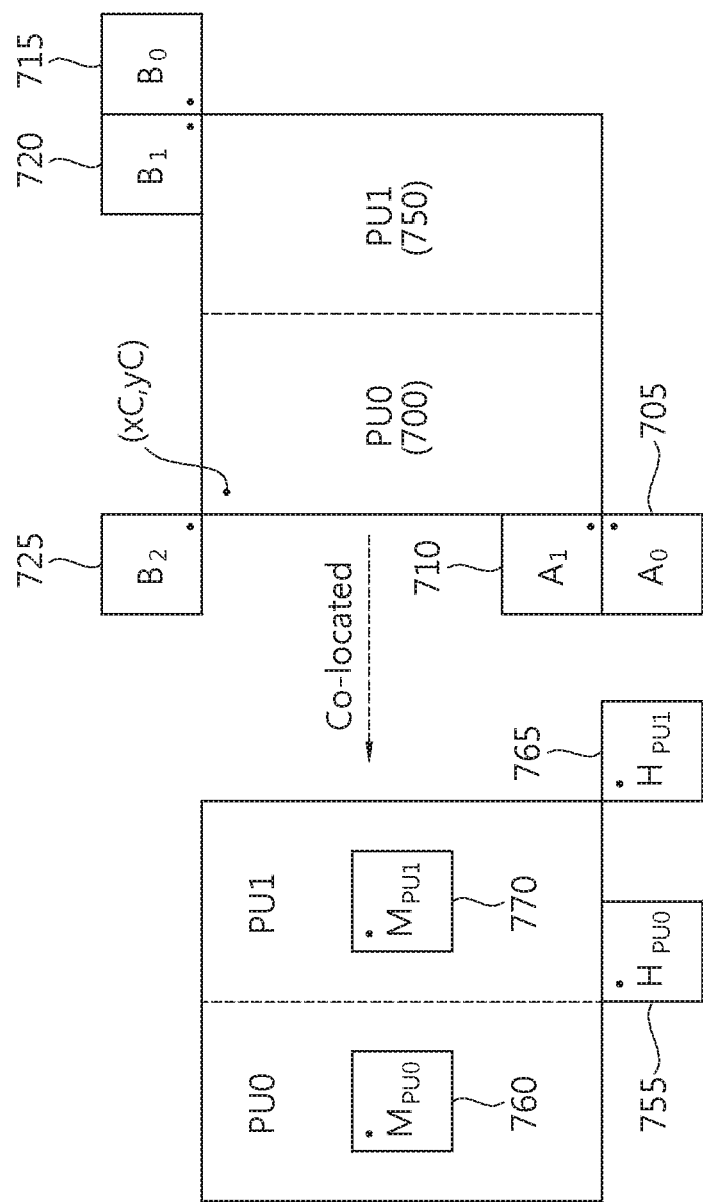
FIG. 7 is a conceptual drawing illustrating a method for generating a single merging candidate list by sharing only a spatial merging candidate in a plurality of prediction block according to an embodiment of the present invention.

FIG. 7 is a conceptual drawing illustrating a method for generating a single merging candidate list by sharing only a spatial merging candidate in a plurality of prediction block according to an embodiment of the present invention.

FIG. 7 illustrates a method for generating a single merging candidate list, where a plurality of prediction blocks divided from one coding block share only a spatial merging candidate determined based on the coding block while a temporal merging candidate uses a merging candidate derived based on each of the prediction blocks.

With respect to FIG. 7, a first prediction block 700 and a second prediction block 750 can share the same spatial merging candidate. The spatial merging candidate block of the first 700 and the second prediction block 750 is determined based on a coding block and A0 block 750, A1 block 710, B0 block 715, B1 block 720, and B2 block 725 can be used as a spatial merging candidate block. Each block can be located at a position derived based on a coding block.

A temporal merging candidate block (or a co-located block) of the first 700 and the second prediction block 750 can be derived based on the position of each prediction block.

The first prediction block 700 uses at least one block between Hpu0 block 755 and Mpu0 block 760, which are temporal merging candidates determined based on its own block position, as a temporal merging candidate. The second prediction block 750 uses at least one block between Hpu1 block 765 and Mpu1 block 770, which are co-located blocks determined based on its own block position, as a temporal merging candidate. As described above, the position of the temporal merging candidate block for deriving final motion prediction-related information may correspond to a position moved a little with respect to the positions of Hpu0 block 755, Mpu0 block 760, Hpu1 block 765, and Mpu1 block 770.

The temporal merging candidate blocks 755, 765, 770 belong to a pre-encoded or decoded picture; and the first 700 and the second prediction block 750 can carry out inter prediction by generating a merging candidate list in a parallel fashion.

Figure 8:
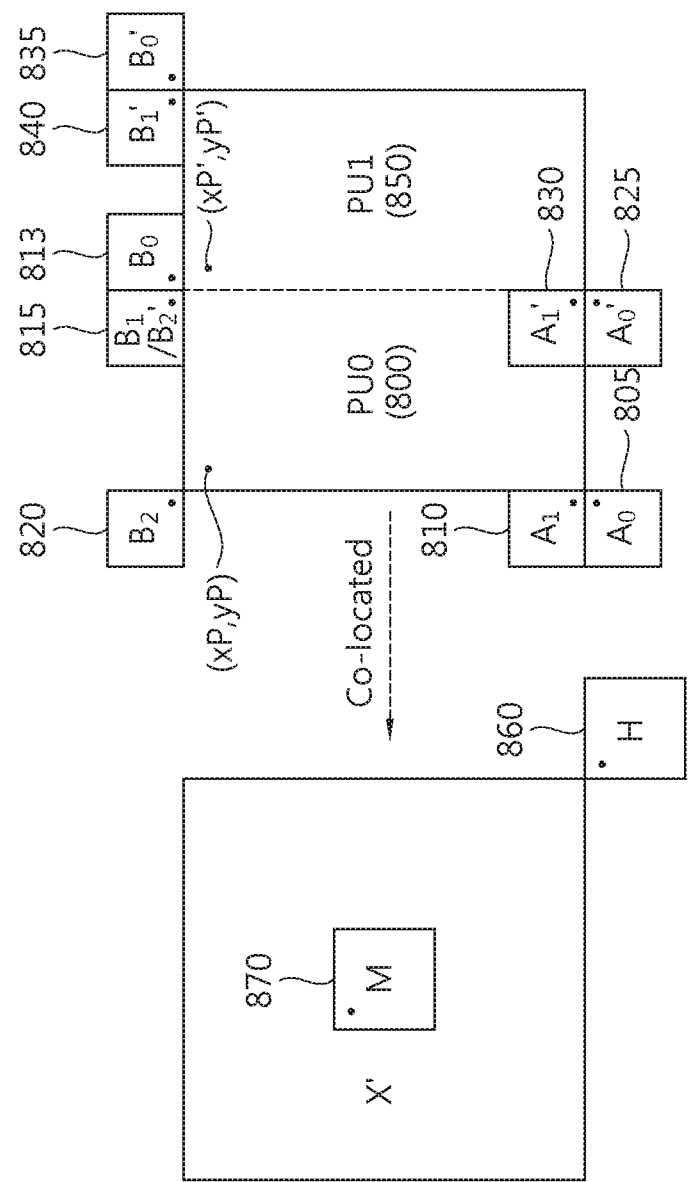
FIG. 8 is a conceptual drawing illustrating a method for generating a single merging candidate list by only a temporal merging candidate in a plurality of prediction block according to an embodiment of the present invention.

FIG. 8 is a conceptual drawing illustrating a method for generating a single merging candidate list by only a temporal merging candidate in a plurality of prediction block according to an embodiment of the present invention.

FIG. 8 illustrates a method for generating a single merging candidate list, where a plurality of prediction blocks divided from one coding block share only a temporal merging candidate determined based on the coding block while a spatial merging candidate uses a merging candidate derived based on each of the prediction blocks.

With reference to FIG. 8, a first prediction block 800 and a second prediction block 850 can derive spatial merging candidates different from each other from the corresponding spatial merging candidate blocks according to the position and the size of each block.

The spatial merging candidate blocks of the first prediction block 800 are A0 block 805, A1 block 810, B0 block 813, and B2 block 820; the position of each block can be derived based on the position of the top-left pixel of the first prediction block 800 and the size (width and height) of the first prediction block 800.

For example, suppose the top-left pixel of the first prediction block is (xP, yP). A spatial merging candidate block of a prediction block then configures such that a block including a pixel at (xP−1, yP+nPbH) is a left first block (or A0 block, 805); a block including a pixel at (xP−1, yP+nPbH−1) a left second block (or A1 block, 810); a block including a pixel at (xP+nPbW, yP−1) a top first block (or B0 block, 813); a block including a pixel at (xP+nPbW−1, yP−1) a top second block (B1 block, 815); and a block including a pixel at (xP−1, yP−1) a top third block (B2 block, 820).

Spatial merging candidate blocks of the second prediction block 850 are A0' block 825, A1' block 830, B0' block 835, B1' block 840, and B2' block 815; and the position of each block can be derived from the position of the top left pixel of the second prediction block 850 and the size (width and height) of the second prediction block 850.

For example, if the top-left pixel of the second prediction block is (xP; yP'), the spatial merging candidate block of the prediction block configures such that a block including a pixel at (xP'−1, yP'+nPbH) is a left first block (or A0' block, 825); a block including a pixel at (xP'−1, yP'+nPbH−1) a left second block (or A1' block, 830); a block including a pixel at (xP'+nPbW, yP'−1) a top first block (or B0; block, 835); a block including a pixel at (xP'+nPbW−1, yP'-1) a top second block (B1' block, 840); and a block including a pixel at (xP'−1, yP'−1) a top third block (B2' block, 815).

In other words, a spatial merging candidate can be derived based on the position and the size of each prediction block 800, 850.

The temporal merging candidate block (or co-located block, 860, 870) of the first 800 and the second prediction block 850 is derived based on a coding block and the two prediction blocks can share the same temporal merging candidate.

The method for deriving a single merging candidate list described above can also be used for generating an AMVP (advanced motion vector prediction) list (or a motion vector predictor candidate list) in the inter prediction mode using AMVP (advanced motion vector prediction).

Figure 9:
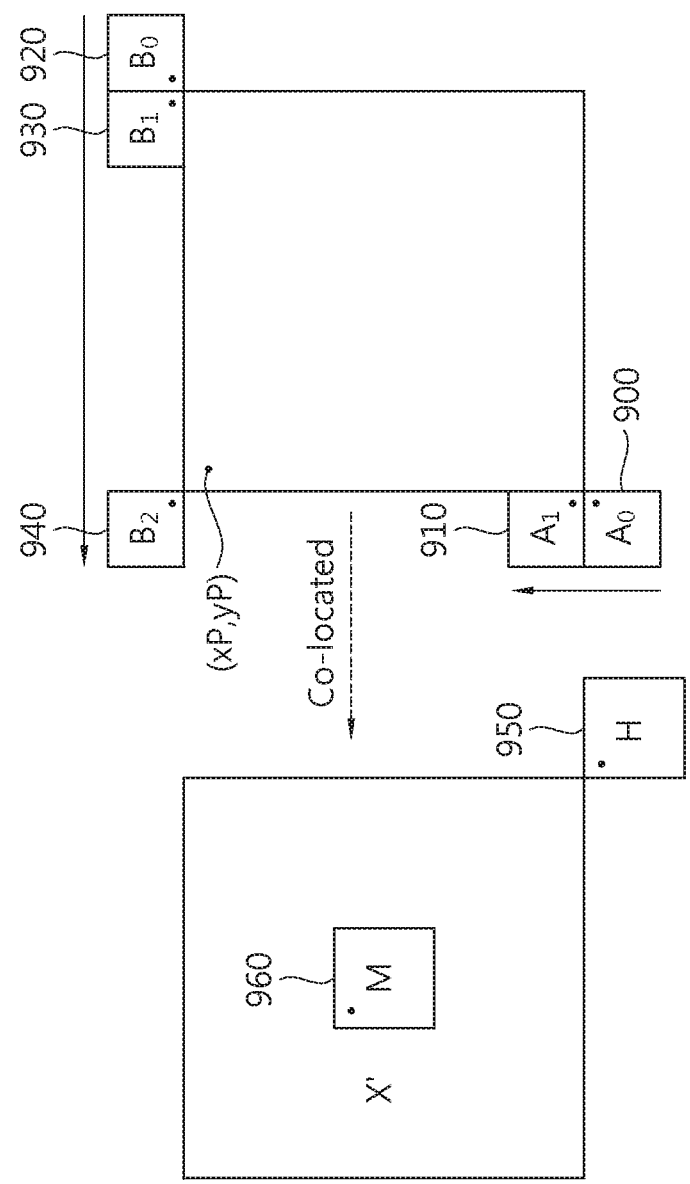
FIG. 9 is a conceptual drawing illustrating an inter-prediction mode using AMVP.

FIG. 9 is a conceptual drawing illustrating an inter-prediction mode using AMVP.

To briefly describe inter prediction mode using AMVP with reference to FIG. 9, a spatial candidate prediction block used in an inter prediction mode using AMVP includes a left first block A0 900, a left second block A1 910, a top first block B0 920, a top second block B1 930, and a top third block B2 940. The spatial candidate prediction blocks can be divided into two spatial candidate prediction groups, where a group comprising the left first block 900 and the left second block 910 is defined as a first spatial candidate prediction group while a group comprising the top first block 920, the top second block 930, and the top third block 940 is defined as a second spatial candidate prediction group.

The temporal candidate prediction block can include a prediction block 950 including a pixel at (xP+nPbW, yP+nPbH) in a co-located picture of a current prediction block based on the pixel position (xP, yP) in a picture including the current prediction block; if a prediction block including a pixel at (xP+nPbW, yP+nPbH) is not available, the temporal candidate prediction block can include a prediction block 960 including a pixel at (xP+(nPbW>>1), yP+(nPbH>>1)). In the same manner as merging, a final temporal merging candidate used for deriving final motion prediction-related information in AMVP may correspond to a block located at a position moved a little with respect to the positions of the first 950 and the second temporal merging candidate 960.

An inter prediction method using AMVP generates a motion vector prediction candidate list based on a motion vector derived from the motion vector derived from each of the spatial candidate prediction groups and a motion vector derived from the temporal candidate prediction block. The motion vector of the derived motion vector prediction candidate list can be used for carrying out inter prediction about the current block.

A method for deriving a motion vector from a candidate prediction block (a spatial candidate prediction block or a temporal candidate prediction block) can be carried out in a parallel fashion. For example, if one candidate prediction motion vector is derived from each of two spatial candidate prediction groups (a first spatial candidate prediction group and a second spatial candidate prediction group) and one candidate prediction motion vector is derived from a temporal candidate prediction block in case of deriving a candidate prediction motion vector, the operation of deriving candidate prediction motion vectors from the first spatial candidate prediction group, the second spatial candidate prediction group, and the temporal candidate prediction group can be carried out in a parallel fashion. Carrying out the process of deriving candidate prediction motion vectors in a parallel fashion leads to reduction of complexity inherent in the process of deriving candidate prediction motion vectors. In other words, deriving a spatial candidate prediction motion vector from the first spatial candidate prediction group, deriving a spatial candidate prediction motion vector from the second spatial candidate prediction group, and deriving a temporal candidate prediction motion vector from the temporal candidate prediction group can be carried out in a parallel fashion.

According to an embodiment of the present invention, inter prediction using AMVP of each of prediction blocks divided from a coding block can also be carried out in a parallel fashion.

In the same manner as merging, AMVP generates a motion vector prediction candidate list for each prediction block in case one coding block is divided into a plurality of prediction units. In this case, a spatial candidate prediction block of a particular prediction block is included in another prediction block and it has to wait for prediction to be completed. Therefore, when a motion vector prediction candidate list is generated or a spatial candidate prediction block of a particular prediction block is located at a unencoded or undecoded position, there are cases where a motion vector cannot be derived from the corresponding block.

To solve the problem above and construct a motion vector prediction candidate list, a spatial candidate prediction motion vector or a temporal candidate prediction motion vector can be derived by making a plurality of prediction blocks 1) share both of a spatial candidate prediction block and a temporal candidate prediction block, 2) share only the spatial candidate prediction block, or 3) share only a temporal candidate prediction block. In cases of 2) and 3), motion vector prediction candidate lists about a prediction block may differ from each other; however, since only part of the candidates is shared, the term of single motion vector prediction candidate list is defined and used comprehensively for the purpose of convenience.

More specifically, a motion vector prediction candidate list can be shared among prediction blocks different from each other by using:

(1) a method for generating a single motion vector prediction candidate list while a plurality of prediction blocks divided from one coding block share both of a spatial and a temporal candidate prediction block derived based on the coding block;

(2) a method for generating a single motion vector prediction candidate list while a plurality of prediction blocks divided from one coding block share only a spatial merging candidate derived based on the coding block and a temporal candidate prediction block uses a block derived based on each of prediction blocks; and (3) a method for generating a single motion vector prediction list while a plurality of prediction blocks divided from one coding block share only a temporal candidate prediction block derived based on the coding block and a spatial candidate prediction block uses a block derived based on each of prediction blocks.

Figure 10:
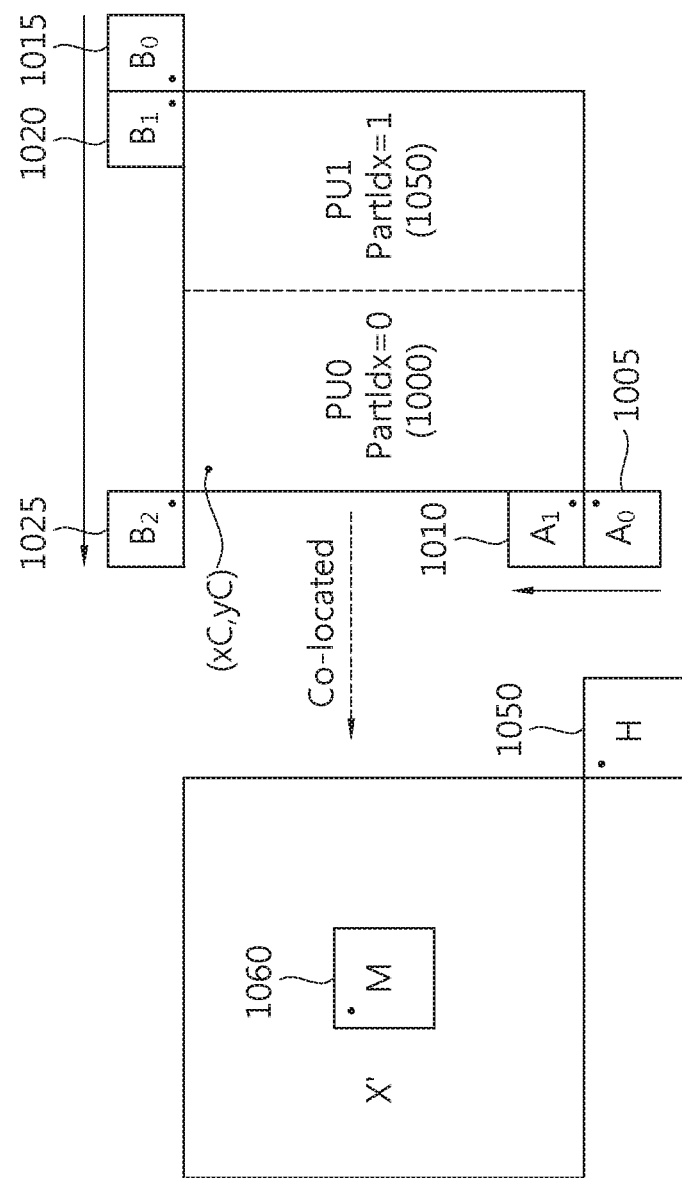
FIG. 10 is a conceptual drawing illustrating a method for generating a single motion vector prediction candidate list by sharing both a spatial candidate prediction block and a temporal candidate prediction block in a plurality of prediction blocks according to an embodiment of the present invention.

FIG. 10 is a conceptual drawing illustrating a method for generating a single motion vector prediction candidate list by sharing both a spatial candidate prediction block and a temporal candidate prediction block in a plurality of prediction blocks according to an embodiment of the present invention.

FIG. 10 illustrates a method for generating a single motion vector prediction candidate list, where a plurality of prediction blocks divided from one coding block share both of a spatial candidate prediction block and a temporal candidate prediction block determined based on the coding block. In the following embodiment, it is assumed that all of motion vector prediction candidates derived from candidate prediction blocks are available.

With reference to FIG. 10, a first prediction block 1000 and a second prediction block 1050 share the same spatial candidate prediction block. The spatial candidate prediction block of the first 1000 and the second prediction block 1050 is determined based on a coding block, which can correspond to A0 block 1005, A1 block 1010, B0 block 1015, B1 block 1020, and B2 block 1025.

The first 1000 and the second prediction block 1050 derives one motion vector prediction candidate based on the shared A0 1005 and A1 block 1010 while one motion vector prediction candidate is derived based on the B0 1015, B1 1020, and B2 block 1025.

In addition, the first 1000 and the second prediction block 1050 can share a temporal candidate prediction block (or a co-located block 1050, 1060). The first 1000 and the second prediction block 1050 can derives a motion vector prediction candidate from the shared temporal candidate prediction block (or the co-located block 1050, 1060).

In other words, the first 1000 and the second prediction block 1050 can generate a single motion vector prediction candidate list by using motion vector prediction candidates derived based on the spatial candidate prediction blocks 1005, 1010, 1015, 1020, 1025 and the temporal candidate prediction blocks 1050, 1060.

Figure 11:
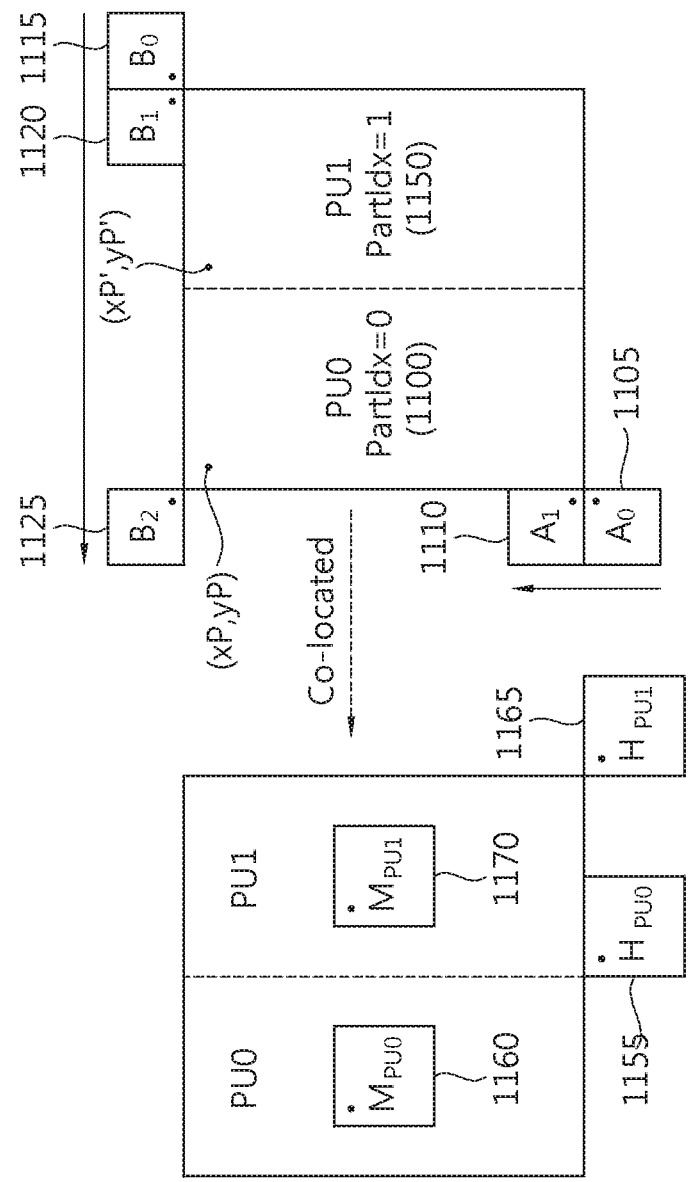
FIG. 11 is a conceptual drawing illustrating a method for generating a single motion vector prediction candidate list by sharing only a spatial candidate prediction block in a plurality of prediction blocks according to an embodiment of the present invention.

FIG. 11 is a conceptual drawing illustrating a method for generating a single motion vector prediction candidate list by sharing only a spatial candidate prediction block in a plurality of prediction blocks according to an embodiment of the present invention.

FIG. 11 illustrates a method for deriving a motion vector prediction candidate, where a plurality of prediction blocks divided from one coding block share only a spatial candidate prediction block determined based on the coding block. In other words, described is a method for generating a single motion vector prediction candidate list, where a temporal candidate prediction block derives a motion vector prediction candidate from a block derived based on each of prediction blocks.

With reference to FIG. 11, a first prediction block 1100 and a second prediction block 1150 share the same spatial candidate prediction block. The spatial candidate prediction block of the first 1100 and the second prediction block 1150 is determined based on a coding block, which can share A0 block 1105, A1 block 1110, B0 block 1115, B1 block 1120, and B2 block 1025 and use the individual blocks as a spatial candidate prediction block.

Temporal candidate prediction blocks (or co-located blocks 1155, 1160, 1165, 1170) of the first 1100 and the second prediction block 1150 can be derived based on the positions of the individual prediction blocks.

The first prediction block 1100 uses at least one block from Hpu0 block 1155 and Mpu0 block 1160, which are co-located blocks determined based on their own positions, as a temporal candidate prediction block.

The second prediction block 1150 uses at least one block from Hpu1 block 1165 and Mpu1 block 1170, which are co-located blocks determined based on their own positions, as a temporal candidate prediction block.

The temporal candidate prediction blocks 1155, 1160, 1165, 1170 belong to a pre-encoded or pre-decoded picture; even when they do not share a temporal candidate prediction block, the first 1100 and the second prediction block 1150 generate a motion vector prediction candidate list in a parallel fashion and thus carry out inter prediction.

Figure 12:
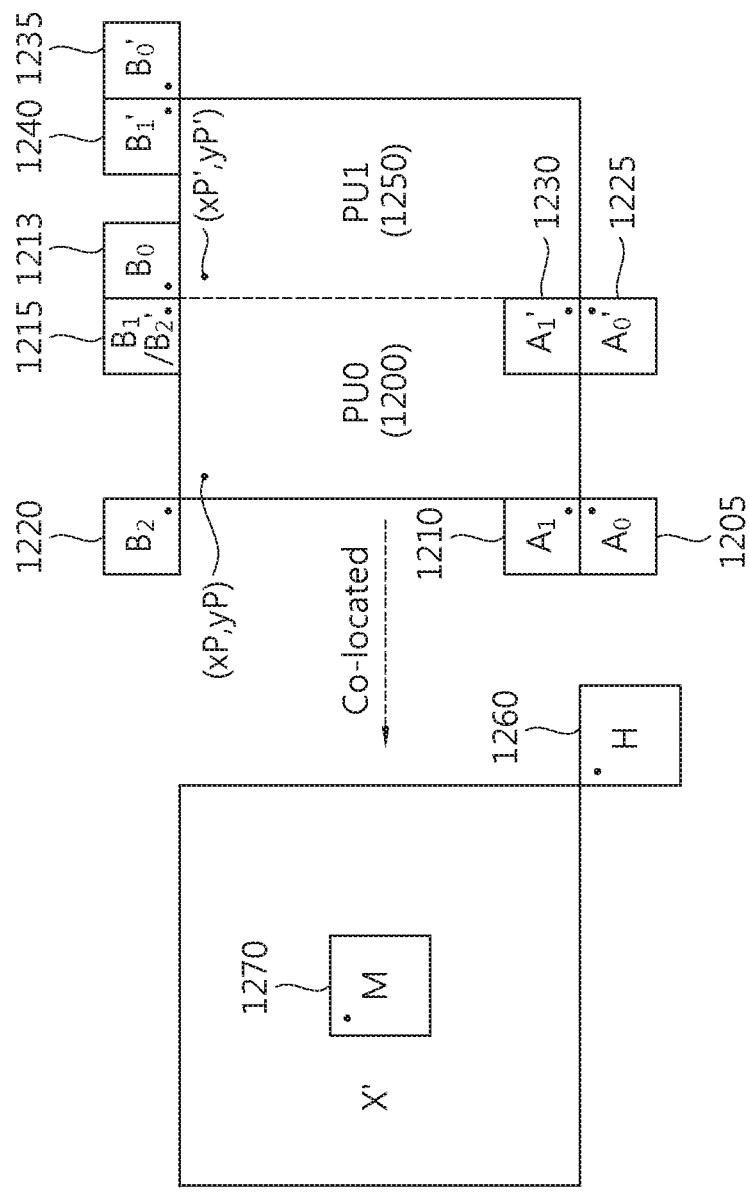
FIG. 12 is a conceptual drawing illustrating a method for generating a single motion vector prediction candidate list by sharing only a temporal candidate prediction block in a plurality of prediction blocks according to an embodiment of the present invention.

FIG. 12 is a conceptual drawing illustrating a method for generating a single motion vector prediction candidate list by sharing only a temporal candidate prediction block in a plurality of prediction blocks according to an embodiment of the present invention.

FIG. 12 illustrates a method for generating a single motion vector prediction candidate list, where a plurality of prediction blocks divided from one coding block share only a temporal candidate prediction block determined based on the coding block and a spatial candidate prediction block uses a block derived based on each of prediction blocks.

With reference to FIG. 12, a first prediction block 1200 and a second prediction block 1250 can use spatial candidate prediction blocks different from each other with respect to the positions of individual prediction blocks. In other words, a spatial candidate prediction block for the first prediction block 1200 may correspond to A0 block 1205, A1 block 1210, B0 block 1212, B1 block 1215, and B2 block 1220 while a spatial candidate prediction block for the second prediction block 1250 may correspond to A0' block 1225, A1' block 1230, B0' block 1235, B1' block 1240, and B2' block 1215.

The temporal merging candidate block (or co-located block, 1260, 1270) of the first 1200 and the second prediction block 1250 is derived based on a coding block and the two prediction blocks can share the same temporal merging candidate.

In the inter prediction mode based on AMVP, a single motion vector prediction candidate list can be generated differently according to a reference picture index referred to by a block. For example, if a current picture (or a slice) has four reference pictures, up to four reference picture indexes can be defined. In this case, since each reference picture index can have a single motion vector prediction candidate list, a total of 'four' single motion vector prediction candidate lists can be generated and used for a target prediction block.

Also, encoding or decoding can be made to be carried out in such a way that all the prediction blocks within a current encoding block use the same reference picture index. In this case, since all of prediction blocks within the current encoding block have the same reference picture index, it suffices to have only one single motion vector prediction candidate list. Whether to apply these methods can be determined differently according to the size or depth of the coding block.

In addition to the method described above, various other methods can be used to generate a single merging candidate list and a single motion vector prediction candidate list. In the following, a method for generating various candidate lists (single merging candidate list, single motion vector prediction candidate list) will be described.

FIG. 13 is a conceptual drawing illustrating a method for generating a single merging candidate list according to an embodiment of the present invention.

Although FIG. 13 illustrates a method for generating a single merging candidate list for the convenience of description, it can still be applied to a method for generating a single motion vector prediction candidate list (AMVP list).

As described above, the position of a temporal merging candidate and a spatial merging candidate can be varied arbitrarily and at the same time, the number of temporal merging candidates and spatial merging candidates can be changed.

With reference to FIGS. 13A and 13B, the position of a spatial merging candidate block and the position of a temporal merging candidate block for generating a single merging candidate list can be newly defined.

In FIG. 13A, the position of A1 block 1300 can be newly defined as the position including a pixel at (xC−1, yC+nCS/2) while the position of B1 block 1305 can be newly defined as the position including a pixel at (xC+nCS/2, yC−1).

Also, in addition to the existing position, the position at which a temporal merging candidate block can be derived can include H1 block 1310, H2 block 1320, H3 block 1330, and H4 block 1340. In a co-located block, the H1 block 1310 may correspond to the block including a pixel at (xC+nCS/2, yC+nCS); the H2 block 1320 the block including a pixel at (xC+nCS, yC+nCS/2); the H3 block 1330 the block including a pixel at (xC, yC+nCS); and the H4 block 1340 the block including a pixel at (xC+nCS, yC).

In FIG. 13B, the position of A1 block 1350 can be newly defined as the position including a pixel at (xC−1, yC+nCS/2-1) while the position of B1 block 1355 can be newly defined as the position including a pixel at (xC+nCS/2, yC−1).

Also, in addition to the existing position, the position of a temporal merging candidate block can include H1 block 1360, H2 block 1360, H3 block 1380, and H4 block 1390. In a co-located block, the H1 block 1360 may correspond to the block including a pixel at (xC+nCS/2, yC+nCS); the H2 block 1370 the block including a pixel at (xC+nCS, yC+nCS/2); the H3 block 1380 the block including a pixel at (xC, yC+nCS); and the H4 block 1390 the block including a pixel at (xC+nCS, yC).

The method of generating a single merging candidate list and a single motion vector prediction candidate list above describes a method for generating a single merging candidate list and a single motion vector prediction candidate list based on a coding block; and the method also describes that the size of a coding block from which a single merging candidate list and a single motion vector prediction candidate list are generated may be limited. A concept of single candidate list can be introduced to integrate the concept of single merging candidate list and single motion vector prediction candidate list.

Also, according to the embodiment of the present invention a single candidate list can be generated by using an ordinary block (for example, a block of a particular size including at least one coding block or at least one prediction block) rather than a coding block. Also, the method for generating a single candidate list can also be applied only to one inter prediction mode between merging and AMVP.

The specifics above can be summarized as shown in Table 1 below.

TABLE 1

|  | Generation of a single merging candidate list | Generation of a single motion vector prediction candidate list | Generation of a single merging candidate list and a single motion vector prediction candidate list |
|---|---|---|---|
| coding block based (namely, shared among prediction blocks within the same coding block) | (A) | (B) | (C) |
| Block size based (namely, shared among prediction blocks belonging to an area of a particular block size) | (D) | (E) | (F) |
| coding block size based (namely, shared among prediction blocks within the same coding block only when the size of the coding block is smaller than a particular size) | (G) | (H) | (I) |

Table 1 classifies methods according to the block type from which a single candidate list is generated, block size, and type of method between merging and AMVP applied to the inter prediction by which a single merging candidate list is generated.

Figure 14:
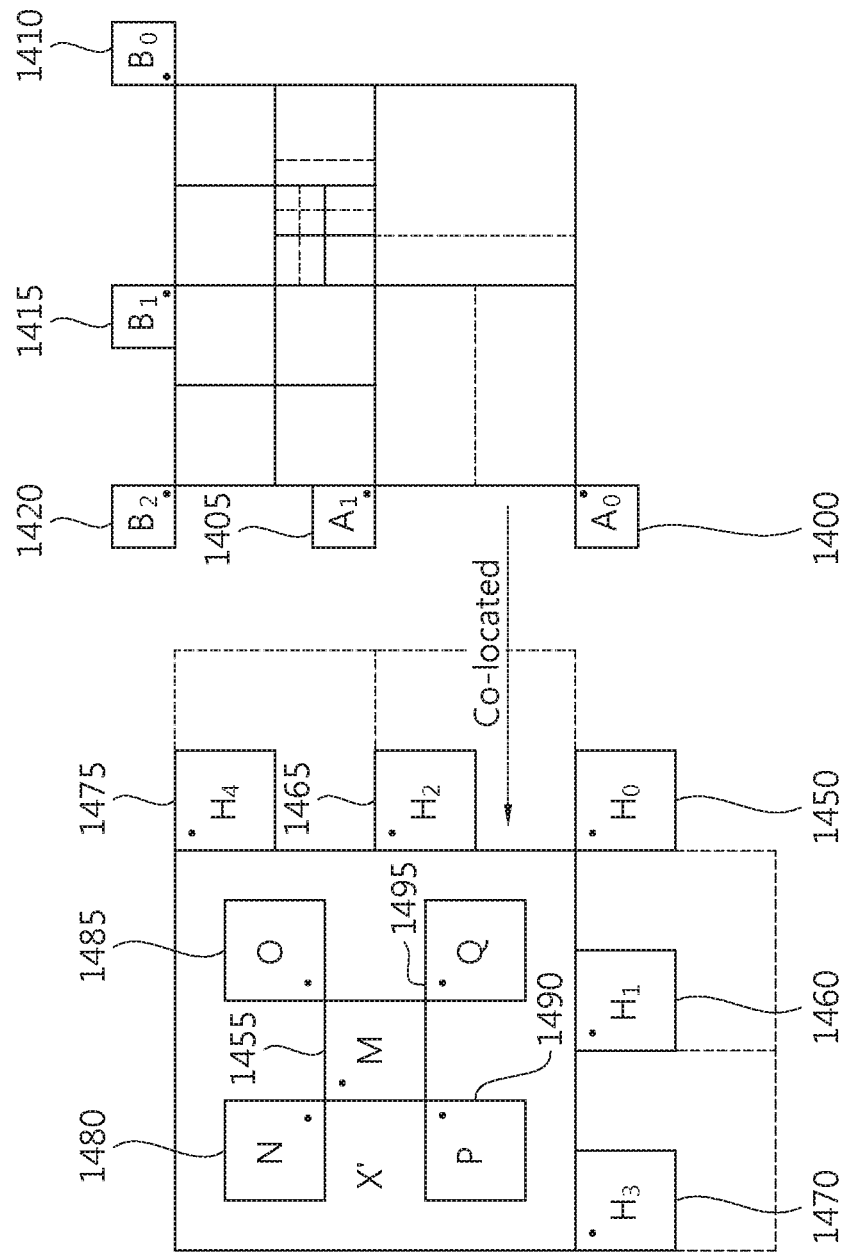
FIG. 14 is a conceptual drawing illustrating a method for generating a single merging candidate list according to an embodiment of the present invention.

FIG. 14 is a conceptual drawing illustrating a method for generating a single merging candidate list according to an embodiment of the present invention.

FIG. 14 describes a method of sharing a single merging candidate list based on a block in inter prediction using merge.

With reference to FIG. 14, the area indicated by solid lines represents a coding block while the area indicated by dotted lines represents a prediction block divided from the corresponding coding block. FIG. 14 shows that a larger block unit including a plurality of coding blocks is used as the unit by which a spatial merging candidate block 1400, 1405, 1410, 1415, 1420 and a temporal merging candidate block 1450 to 1480. are derived. In other words, a single merging candidate list can be generated by a block larger than a coding block. Such information can be encoded and decoded as the information about a block to which parallel merge processing can be applied. According to the embodiment of the present invention, whether a prediction block included in a particular coding block carries out merging can be determined by using a single merging candidate list based on the information about a block to which parallel merge processing can be applied and the information about a coding block including a prediction block.

A spatial merging candidate block belonging to a block to which parallel merge processing can be applied from among spatial merging candidate blocks derived from a coding block belonging to a block to which parallel merge processing can be applied is a unavailable block and may not be used for deriving a spatial merging candidate. On the contrary a spatial merging candidate block belonging to the outside of a block to which parallel merge processing can be applied can be used for deriving a spatial merging candidate during inter prediction by merging. In other words, a spatial merging candidate block belonging to a block to which parallel merge processing can be applied may be determined as a unavailable spatial merging candidate block and may not be used to derive a spatial merging candidate.

To carry out the determination, determined is whether a current block (a target prediction block) and a spatial merging candidate block of the current block are included in a block to which the same parallel merge processing can be applied. If the current block (the target prediction block) and a spatial merging candidate block of the current block are included in a block to which the same parallel merge process can be applied, the corresponding block is determined as unavailable and may not be used for constructing a merging candidate list.

A temporal merging candidate block related to the block satisfying the above conditions, too, can be derived based on a block to which parallel merge processing can be applied. In other words, in case a prediction block included in a particular coding block carries out merging by using a single merging candidate list, the same temporal merging candidate for the prediction block can be shared and used.

FIG. 15 is a conceptual drawing illustrating a method for generating a single merging candidate list according to an embodiment of the present invention.

FIG. 15 describes a method for prediction blocks within the same coding block to share a spatial merging candidate and a temporal merging candidate only when the size of the coding block is smaller than or equal to a particular size during inter prediction by merging.

Various kinds of information can be used to employ a method for sharing a single merging candidate list only for the blocks satisfying particular conditions. For example, information about whether a current block uses a single merging candidate list can be derived based on the information about the size of a block to which parallel merge processing can be applied and the size information of a current encoding block. According to the derived information, a spatial merging candidate and a temporal merging candidate for a prediction block can be derived with respect to a coding block satisfying particular conditions.

With reference to FIG. 15, for example, only when the size of a block to which parallel merge processing can be applied is 8×8 or more and size of a coding block is 8×8, prediction blocks divided from the coding block can share a single merging candidate list.

Now it is assumed that a first coding block CU0 1500 is a 32×32 block; a second coding block CU1 1510 is a 16×16 block; a third coding block CU2 1520 is a 32×32 block; a fourth coding block CU3 1530 is a 16×16 block; and a fifth coding block CU4 1540 is a 8×8 block.

FIG. 15B is a conceptual drawing showing only a spatial merging candidate block about part of an coding block.

With reference to FIG. 15B, the second coding block 1510 is divided into two prediction blocks 1515, 1518 of nL×2N form while the fifth coding block 1540 is divided into two prediction blocks 1545, 1550 of N×2N form. FIG. 15B assumes that a single merging candidate list is generated only for a coding block of 8×8 size 1540.

A first prediction block 1515 and a second prediction block 1518 of the second coding block 1510 derive a spatial merging candidate for each of the prediction blocks and generate a merging candidate list for the individual prediction blocks.

The size of the fifth coding block 1540 is 8×8 and satisfies the conditions imposed on the size of a block to which parallel merge processing can be applied and the size of a current encoding block. In this case, a third prediction block 1545 and a fourth prediction block 1550 included in the fifth coding block 1540 can generate a single merging candidate list based on a spatial merging candidate and a temporal merging candidate derived from the position and the size of the coding block.

In other words, whether the size of a block defined to be to which parallel merge processing can be applied is larger than a predetermined particular size and a coding block is of a particular size is determined and if the size of the block defined to be to which parallel merge processing can be applied is larger than the predetermined particular size and the coding block is of the particular size, it can be determined that the prediction unit carries out merging by using the single merging candidate list.

A spatial merging candidate block belonging to a block to which parallel merge processing can be applied from among spatial merging candidate blocks derived from a coding block belonging to a block to which parallel merge processing can be applied may not be used for deriving a spatial merging candidate. On the contrary a spatial merging candidate block belonging to the outside of a block to which parallel merge processing can be applied can be used for inter prediction by merging. In other words, a spatial merging candidate block belonging to a block to which parallel merge processing can be applied may be determined as a unavailable spatial merging candidate block and may not be used to derive a spatial merging candidate.

For example, to carry out the determination, determined is whether a current block (a target prediction block) and a spatial merging candidate block of the current block are included in a block to which the same parallel merge processing can be applied. If the current block (the target prediction block) and a spatial merging candidate block of the current block are included in a block to which the same parallel merge processing can be applied, the corresponding spatial merging candidate block is determined as unavailable and may not be used for deriving a spatial merging candidate from a spatial merging candidate block.

As described above, to generate a single merging candidate list for a coding block of a particular size, 1) information related to the size of a block to which parallel merge processing can be applied during inter prediction by merging and 2) a single merging candidate list flag (singleMCLflag) indicating that the corresponding block generates a single merging candidate list based on the size information of a current block can be derived. Also, since which spatial merging candidate block corresponds to a unavailable block in deriving a spatial merging candidate can be known from 1) the information related to the size of a block to which parallel merge processing can be applied during inter prediction by merging, a spatial merging candidate may not be derived from the corresponding block.

For example, suppose the size of the block to which parallel merge processing can be applied is 8×8 and the size of a current encoding block is 8×8. If the coding block and a spatial merging candidate block derived based on the coding block belong to the same block to which parallel merge processing can be applied, the spatial merging candidate block can be determined as unavailable. In other words, in case the coding block and the spatial merging candidate block derived based on the coding block belong to a block to which different parallel merge processing can be applied, the corresponding spatial merging candidate block can be used for deriving a spatial merging candidate.

The derived single merging candidate list flag (singleMCLflag) is employed subsequently when a spatial merging candidate and a temporal merging candidate are derived and used for generating a single merging candidate list where the same merging candidates are shared by prediction blocks divided from a coding block of a particular size.

In what follows, an embodiment of the present invention describes with reference to Tables 2 to 5 information related to a block to which parallel merge processing can be applied during inter prediction by merging and syntax structure used for encoding the information into a bit stream or decoding the bit stream.

TABLE 2

| seq_parameter_set_rbsp( ) { | Descriptor |
|---|---|
| profile_idc | u(8) |
| reserved_zero_8bits /* equal to 0 */ | u(8) |
| level_idc | u(8) |
| ... | ue(v) |
| parallel_merge_enabled_flag | u(1) |
| if(parallel_merge_enabled_flag) | |
| parallel_merge_disabled_depth_info | ue(v) |
| ... | |

TABLE 3

| pic_parameter_set_rbsp( ) { | Descriptor |
|---|---|
| pic_parameter_set_id | ue(v) |
| seq_parameter_set_id | ue(v) |
| entropy_coding_mode_flag | u(1) |
| ... | |
| parallel_merge_enabled_flag | u(1) |
| if(parallel_merge_enabled_flag) | |
| parallel_merge_disabled_depth_info | ue(v) |
| ... | |

TABLE 4

| slice_header( ) { | Descriptor |
|---|---|
| lightweight_slice_flag | u(1) |
| if( !lightweight_slice_flag ) { | |
| slice_type | ue(v) |
| pic_parameter_set_id | ue(v) |
| frame_num | u(v) |
| ... | |
| parallel_merge_enabled_flag | u(1) |
| if(parallel_merge_enabled_flag) | |
| parallel_merge_disabled_depth_info | ue(v) |
| ... | |

TABLE 5

| slice_header( ) { | Descriptor |
|---|---|
| lightweight_slice_flag | u(1) |
| if( !lightweight_slice_flag ) { | |
| slice_type | ue(v) |
| pic_parameter_set_id | ue(v) |
| frame_num | u(v) |
| ... | |
| } | |
| if( entropy_coding_mode_flag && slice_type != I) | |
| cabac_init_idc | ue(v) |
| first_slice_in_pic_flag | u(1) |
| ... | |
| parallel_merge_enabled_flag | u(1) |
| if(parallel_merge_enabled_flag) | |
| parallel_merge_disabled_depth_info | ue(v) |
| ... | |

"parallel_merge_enabled_flag" included in the syntax of Tables 2 to 5 can be used as information indicating whether to use a single merging candidate list based on a coding block. Also, "parallel_merge_enabled_flag" can include information about whether a parallel merge process is carried out.

For example, in case "parallel_merge_enabled_flag" is 1, it indicates that a method for generating a single merging candidate list has been applied based on a coding block and indicates a parallel merge process to be carried out whereas, in case "parallel_merge_enabled_flag" is 0, it may indicate that a single merging candidate list has not been applied and a parallel merge process is not applicable; and vice versa. Also, "parallel_merge_enabled_flag" can be used as the information indicating whether to encode or decode all of the prediction blocks within a coding block in a parallel fashion and as the information indicating whether to construct a merging candidate list of all the prediction blocks within the coding block in a parallel fashion.

Meanwhile, "parallel_merge_disabled_depth_info" is activated when a method for generating a single merging candidate list is applied based on a coding block (for example, when "parallel_merge_enabled_flag" has a true value), informing the applicability of a single merging candidate list according to the depth or the size of the coding block.

For example, in case "parallel_merge_disabled_depth_info" is 0, the corresponding method may not be applied if the depth of the coding block is 0 (which corresponds to the largest coding block, for example, 64×64 sized block). In case "parallel_merge_disabled_depth_info" is 1, the corresponding method may not be applied if the depth of the coding block is 1 (which corresponds to a size one step smaller than the largest coding block, for example, 32×32 sized block).

As another example, in case "parallel_merge_disabled_depth_info" is 0, the corresponding method may not be applied if the depth of the coding block is more than 0 (which corresponds to the largest coding block). Similarly, in case "parallel_merge_disabled_depth_info" is 1, the corresponding method may not be applied if the depth of the coding block is more than 1 (this case describes the sizes of the coding block except for the largest coding block; for example, if the size of the largest coding block is 64×64, the coding block size can take 32×32, 16×16, and 8×8.)

As yet another example, in case "parallel_merge_disabled_depth_infor" is 1, the corresponding method may not be applied if the depth of the coding block is more than 1 (which corresponds to the coding block sizes except for the largest coding block).

The "parallel_merge_disabled_depth_info" is one example of information related to a block to which parallel merge processing can be applied during inter prediction by merging; a different syntax element may be used to represent a parallel merge process during inter prediction by merging and this embodiment also belongs to the technical scope of the present invention.

On the other hand, information about whether a parallel merge process is applicable can be represented by using only "parallel_merge_disabled_depth_info" even if information such as "parallel_merge_enabled_flag" is not employed. For example, in case "parallel_merge_disabled_depth_info" corresponds to a particular value, it may indicate that a parallel merge process is not possible. And such an embodiment also belongs to the technical scope of the present invention.

As still another example, log 2_parallel_merge_level_minus2 can be defined. log 2_parallel_merge_level_minus2 indicates a level at which a parallel merge process can be applied. For example, if the value of log 2_parallel_merge_level_minus2 is 0, it indicates the size of a block (or a coding block) to which parallel merge processing can be applied is 4×4. If it is assumed that the 4×4 block is the smallest coding block, it indicates that parallel merge processing is not carried out when the value of log 2_parallel_merge_level_minus2 is 0. As another example, if log 2_parallel_merge_level_minus2 is 1, it indicates that parallel merge processing can be applied to all of the prediction blocks belonging to an 8×8 sized block. If log 2_parallel_merge_level_minus2 is 2, parallel merge processing can be applied to all of the prediction blocks belonging to a 16×16 sized block. If log 2_parallel_merge_level_minus2 is 3, parallel merge processing can be applied to all of the prediction blocks belonging to a 32×32 sized block. If log 2_parallel_merge_level_minus2 is 4, parallel merge processing can be applied to all of the prediction blocks belonging to a 64×64 sized block. In other words, by using the syntax element above, the size of a block to which particular parallel merge processing can be applied is specified. As described above, whether inter prediction using a single merging candidate list is carried out for at least one prediction block included in a current block can be determined by using the information about the block to which parallel merge processing can be applied derived through log 2_parallel_merge_level_minus2 and the information of the current block (for example, size information). It can be determined whether a spatial merging candidate block derived based on a coding block to derive a spatial merging candidate included in a single merging candidate list belongs to the block to which parallel merge processing can be applied. For example, suppose the block for which parallel merge processing is applied is an 8×8 sized block and the size of the current encoding block is 8×8. If the coding block and a spatial merging candidate block derived based on the coding block belong to a block for which the same parallel merge processing can be applied, the spatial merging candidate block can be determined a unavailable spatial merging candidate. In other words, if a coding block and a spatial merging candidate block derived based on the coding block belong to an block for which different parallel merge processing can be applied, the corresponding spatial merging candidate block can be used for deriving a spatial merging candidate.

In the following embodiment of the present invention, a method for carrying out encoding or decoding prediction blocks divided from one coding block in a parallel fashion by using a single candidate list according to another embodiment will be described. The method to be described can generate a single merging candidate list by sharing part of spatial candidates for a few prediction blocks within a coding block.

In sharing part of spatial candidates, too, by making the search position of a spatial merging candidate block of all the prediction blocks within the coding block always located outside of the coding block, inter prediction can be made to be carried out in a parallel fashion in a prediction block within the coding block. Similarly, a merging candidate list can be generated by using a spatial merging candidate block located at a fixed position according to a division pattern of the block.

For example, complexity of a process for deriving a merging candidate during inter prediction by merging can be reduced as each of the prediction blocks share part of spatial merging candidates.

For example, in selecting the search position of a spatial merging candidate of a prediction block outside of the coding block, those prediction blocks divided along a vertical direction (for example, in the form of N×2N) can be made to share a spatial merging candidate block in the left position from among outside positions of the coding block. Prediction blocks divided along a horizontal direction (for example, in the form of 2N×N) can be made to share a spatial merging candidate block in the top position from among outside positions of the coding block. In other words, the number of deriving a spatial merging candidate can be significantly reduced compared with the method which does not share a merging candidate.

Now, an embodiment of the above method will be described in more detail with reference to a related drawing.

In the following embodiment, it is assumed that inter prediction by merging is employed; however, the methods described later can also be sued for inter prediction based on AMVP. Spatial merging candidate blocks and temporal merging candidate blocks used in a merging method in the following correspond to a plurality of prediction blocks for constructing a motion vector prediction candidate list with respect to a prediction block in the context of AMVP and can be interpreted as spatial candidate prediction blocks and temporal candidate prediction blocks.

In the following embodiment of the present invention, prediction blocks can be identified by using a division index of a divided block. In case the division index is 0, it indicates a first prediction block while in case the division index is 1, it can be a second prediction block.

FIG. 16 is a conceptual drawing illustrating a method for generating a merging candidate list according to an embodiment of the present invention.

FIG. 16A illustrates a case where a coding block is divided into a prediction block of N×2N form. In case of a first prediction block 1600, a merging candidate list can be generated with respect to the position of the first prediction block 1600 by using A0 block 1605, A1 block 1610, B0 block 1615, B1 block 1629, and B2 block 1625 as the spatial merging candidate block.

However, in case of a second prediction block 1650, if a spatial merging candidate block is derived based on the position of the second prediction block, a part of spatial merging candidate blocks, A0 block 1630 and A1 block 1635, may be located at the positions belonging to the first prediction block or at the position of a coding block not encoded yet. In case a spatial merging candidate block is located at such position, inter prediction by merging for the first 1600 and the second prediction block 1650 cannot be carried out in a parallel fashion. Therefore, inter prediction by merging can be carried out by changing the positions of the A0 block 1630 and the A1 block 1635 used as the spatial merging candidate block into A0' block 1605 and A1' block 1610 located outside of the coding block and deriving a merging candidate list about the second prediction block 1650. The A0' block 1605 and the A1' block 1610 can be located at the same positions as those of spatial merging candidate blocks of the first prediction block 1600.

FIG. 16B illustrates a case where a coding block is divided into a prediction block of 2N×N form. In case of a first prediction block 1660, a merging candidate list can be generated with respect to the position of the first prediction block 1660 by using A0 block 1665, A1 block 1667, B0 block 1673, B1 block 1675, and B2 block 1679 as the spatial merging candidate block.

However, in case of a second prediction block 1690, if a spatial merging candidate block is derived based on the position of the second prediction block 1690, a part of spatial merging candidate blocks, B0 block 1685 and B1 block 1687, may be located at the positions belonging to the first prediction block 1660 or at the position of a coding block not encoded yet. In case a block is located at such position, inter prediction by merging for the first 1660 and the second prediction block 1690 cannot be carried out in a parallel fashion. Therefore, inter prediction by merging can be carried out by changing the positions of the B0 block 1685 and the B1 block 1687 into A0' block 1673 and A1' block 1675 located outside of the coding block and deriving a merging candidate list about the second prediction block 1690. The B0' block 1673 and the B 1' block 1675 can be located at the positions of spatial merging candidate blocks employed by the first prediction block 1660.

To change the position of a spatial merging candidate block, it is checked whether a current block (a target prediction block) and a spatial merging candidate block of the current block are included in the block to which parallel merge processing can be applied. In case it is found as a checking result that the current block (the target prediction block) and the spatial merging candidate of the current block are included in the same block to which parallel merge processing can be applied, the corresponding block may not be used for constructing a merging candidate list by determining it as unavailable.

Figure 17:
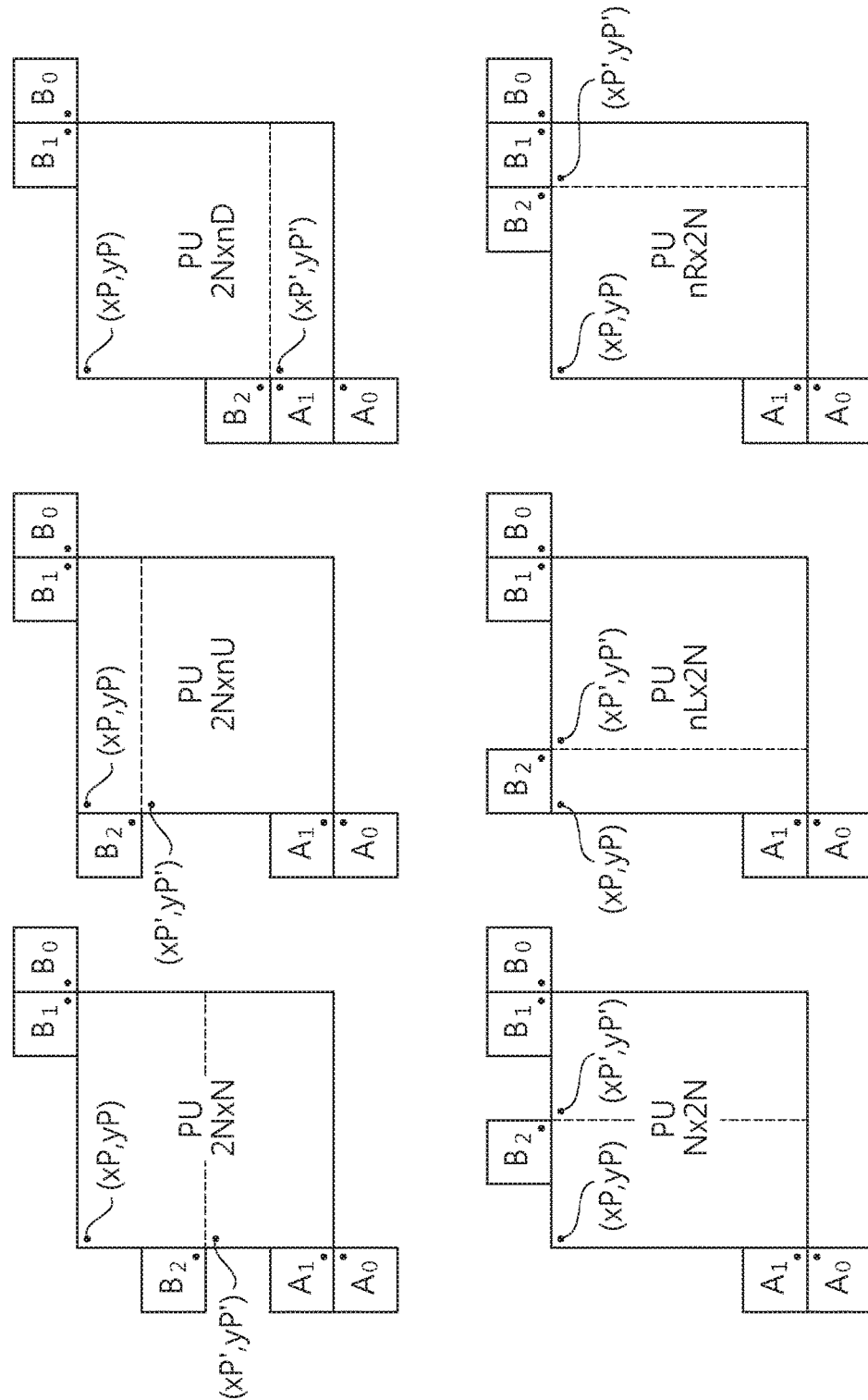
FIG. 17 is a conceptual drawing illustrating a position of a spatial merging candidate according to a division form of a coding block according to an embodiment of the present invention.

FIG. 17 is a conceptual drawing illustrating a position of a spatial merging candidate according to a division form of a coding block according to an embodiment of the present invention.

With reference to FIG. 17, a spatial merging candidate can be derived by deriving spatial merging candidate blocks located at positions different from each other according to the division pattern of a block. In other words, by making the positions of spatial merging candidate blocks of all the prediction blocks located outside of a coding block where encoding has been already completed, inter prediction by merging for a plurality of prediction blocks divided from one coding block in a parallel fashion can be made to be carried out. Also, complexity of a process for deriving a merging candidate list can be reduced by sharing part of spatial merging candidate blocks intended for deriving a spatial merging candidate.

FIG. 18 is a conceptual drawing illustrating a method for generating a merging candidate list according to an embodiment of the present invention.

FIG. 18A illustrates a case where a coding block is divided into a prediction block of N×2N form. In case of a first prediction block 1800, a merging candidate list can be generated with respect to the position of the first prediction block 1800 by using A0 block 1805, A1 block 1810, B0 block 1815, B1 block 1829, and B2 block 1825 as the spatial merging candidate block.

However, in case of a second prediction block 1850, a spatial merging candidate block can be derived with respect to the position of a coding block including the second prediction block 1850. In case a spatial merging candidate block is derived with respect to the second prediction block 1850, inter prediction by merging for the first 1800 and the second prediction block 1850 can be carried out in a parallel fashion. Therefore, a merging candidate list can be derived by using the blocks 1805, 1830, 1835, 1825 as spatial merging candidate blocks, where the blocks are located outside of the coding block including the second prediction block 1850 and at the block positions where encoding or decoding has been already carried out.

FIG. 18B illustrates a case where a coding block is divided into a prediction block of 2N×N form. In case of a first prediction block 1860, a merging candidate list can be generated with respect to the position of the first prediction block 1860 by using A0 block 1865, A1 block 1870, B0 block 1875, B1 block 1880, and B2 block 1885 as the spatial merging candidate block.

However, in case of a second prediction block 1895, inter prediction by merging can be carried out by deriving a merging candidate list for the second prediction block by changing the blocks located at the positions of the blocks located outside of the coding block, for which encoding or decoding has already been carried out, into spatial merging candidate blocks 1887, 1889, 1875, 1880, 1885.

Figure 19:
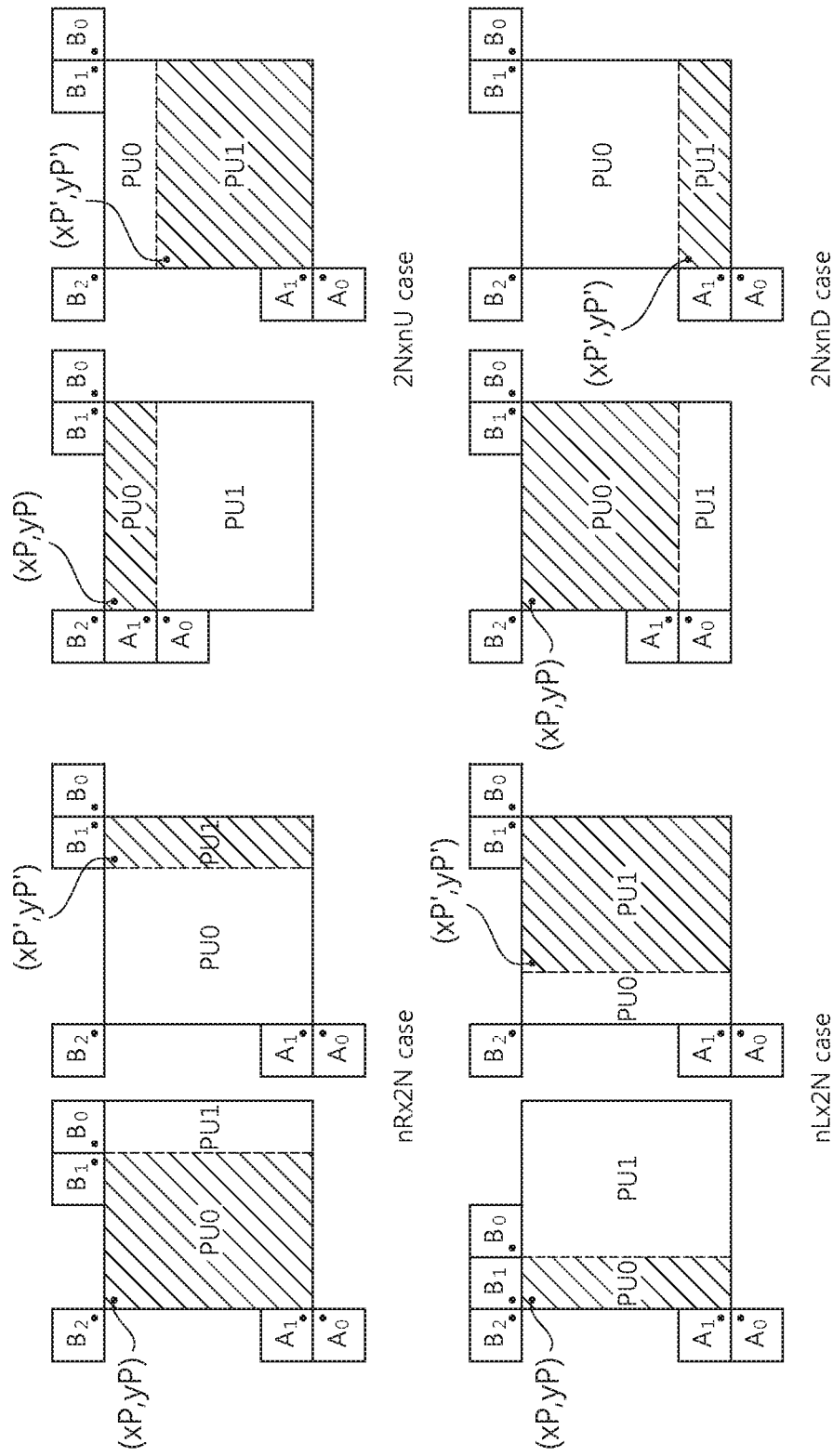
FIG. 19 is a conceptual drawing illustrating a position of a spatial merging candidate according to a division form of a coding block according to an embodiment of the present invention.

FIG. 19 is a conceptual drawing illustrating a position of a spatial merging candidate according to a division form of a coding block according to an embodiment of the present invention.

With reference to FIG. 19, spatial merging candidate blocks at different positions from each other according to the division patterns of individual blocks can be derived and used. In other words, by making spatial merging candidate blocks of all the prediction blocks located outside of the coding block for which encoding has already been completed, inter prediction by merging for a plurality of prediction blocks divided from one coding block can be carried out in a parallel fashion FIG. 20 is a conceptual drawing illustrating a position of a spatial merging candidate according to a division form of a coding block according to an embodiment of the present invention.

With reference to FIG. 20A, in case of a horizontally divided form (2N×nU, 2N×nD, 2N×N) spatial merging candidate blocks at the same position can be used irrespective of division forms by using the spatial merging candidate blocks at the same position, which are A0 block, A1 block, B0 block, B1 block, and B2 block, for a second prediction block.

With reference to FIG. 20B, in case of a horizontally divided form (nL×2N, nR×2N, N×2N) spatial merging candidate blocks at the same position can be used irrespective of division forms by using the spatial merging candidate blocks at the same position, which are A0 block, A1 block, B0 block, B1 block, and B2 block, for a second prediction block.

Figure 20:
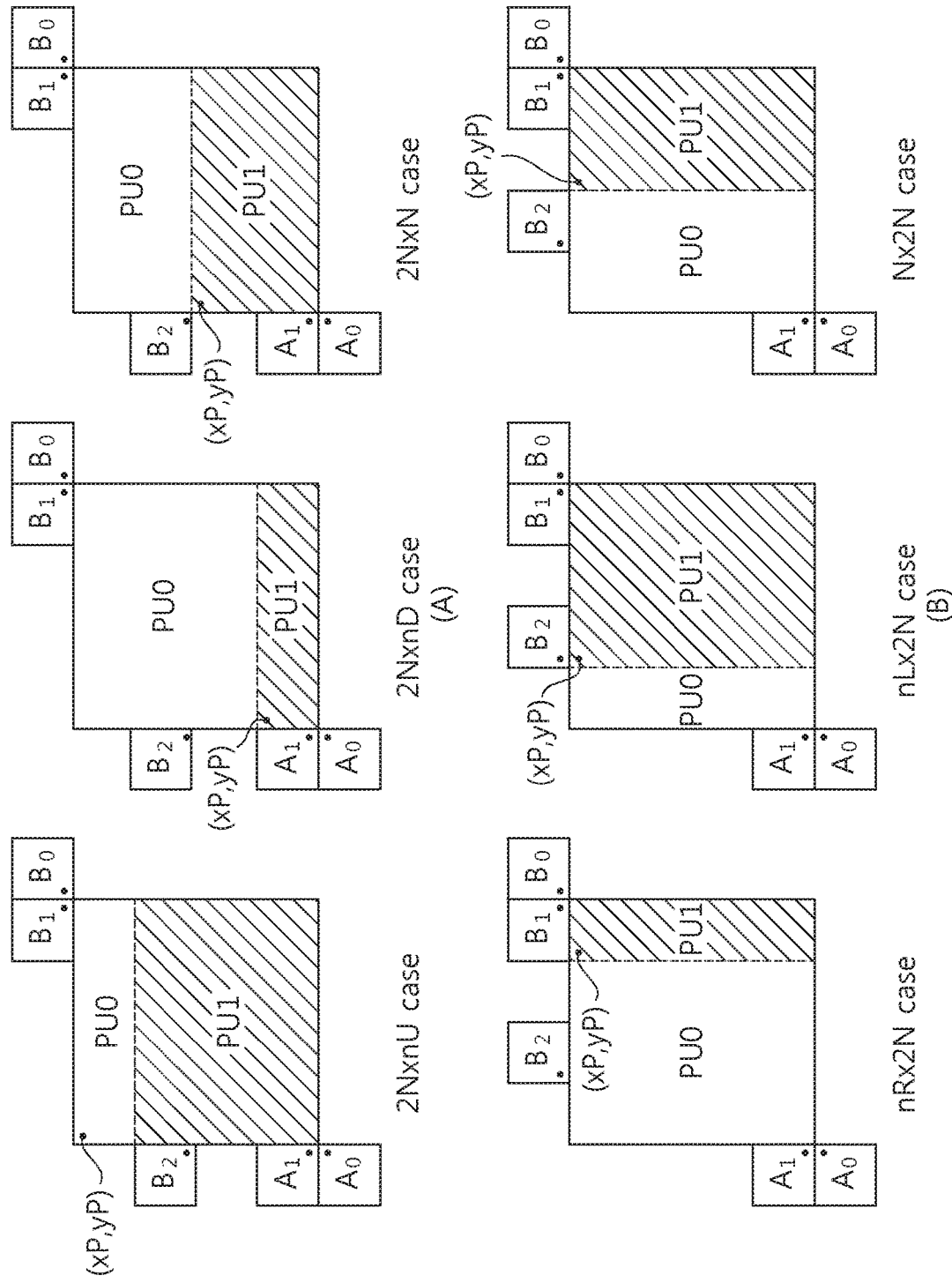
FIG. 20 is a conceptual drawing illustrating a position of a spatial merging candidate according to a division form of a coding block according to an embodiment of the present invention.

A fixed position in FIG. 20 is one example of using a spatial merging candidate block at a fixed position in one coding block. In other words, the fixed position of a spatial merging candidate block can be changed and this embodiment also belongs to the technical scope of the present invention.

Figure 21:
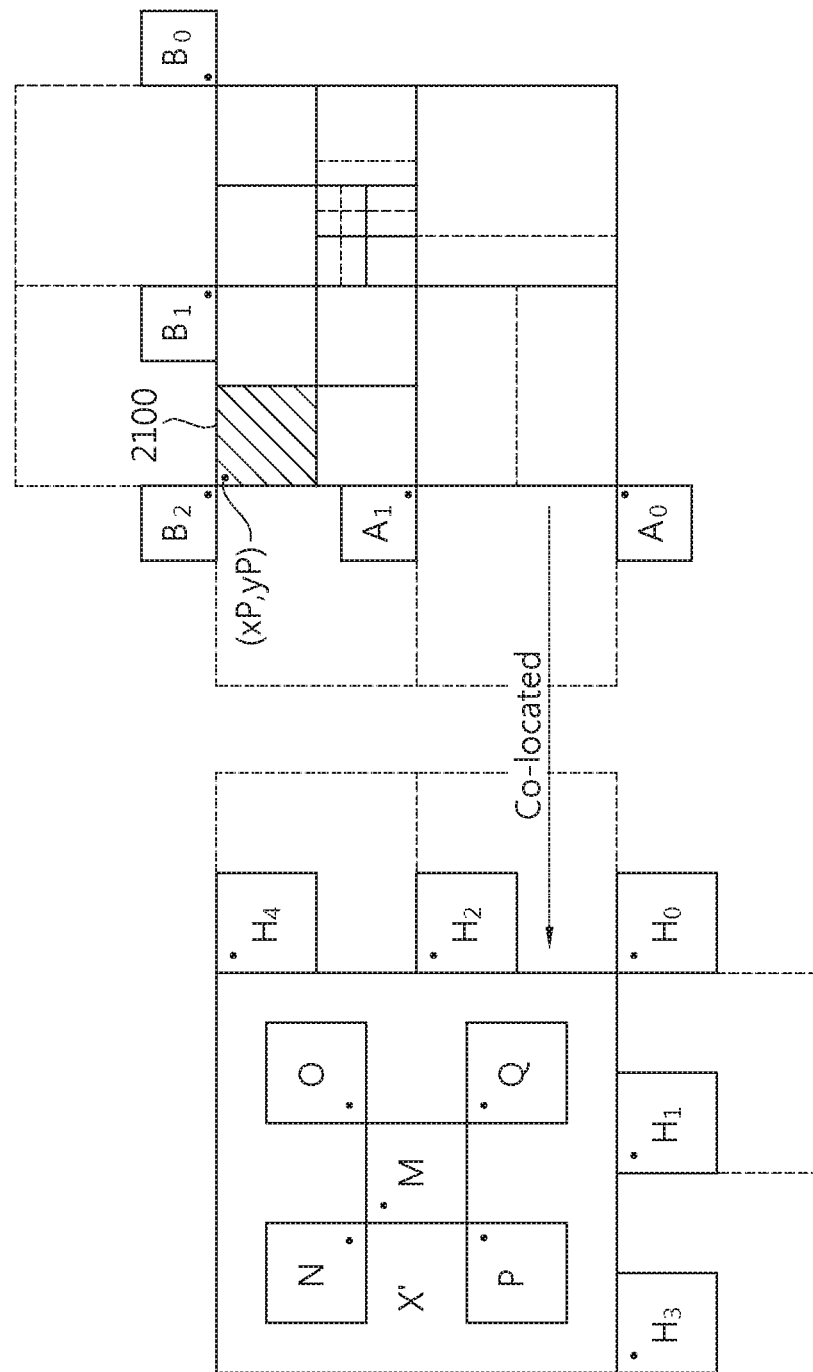
FIG. 21 is a conceptual drawing illustrating a position of a spatial merging candidate according to a division form of a coding block according to an embodiment of the present invention.

FIG. 21 is a conceptual drawing illustrating a position of a spatial merging candidate according to a division form of a coding block according to an embodiment of the present invention.

FIG. 21 illustrates a case where a coding block of a particular size is divided into a plurality of coding blocks. In case the same merging candidate list is shared with respect to a block of a particular size, a spatial merging candidate block can be derived based on the position of the particular-sized block and a single merging candidate list can be constructed by using the derived spatial merging candidate. In case of a coding block corresponding to the top-left of coding blocks included in a block of a particular size, even if spatial merging candidate blocks are derived with respect to the corresponding coding block, all of the spatial merging candidate blocks are located at the positions where encoding has already been carried out; therefore, the top left coding blocks can be used separately by generating a different merging candidate list.

With reference to FIG. 21, among prediction blocks included in a block of a particular size, the remaining prediction blocks except for the prediction block included in the top-left coding block 2100 can share the same spatial merging candidate blocks A0, A1, B0, B1, B2 derived based on the position of the particular-sized block.

However, in case of the top-left coding block 2100 among particular-sized blocks, inter prediction by merging can be carried out by using a spatial merging candidate block derived based on the corresponding coding block. Since in case of the top-left coding block 2100, spatial merging candidate blocks derived based on the corresponding block are all located at available positions, the top-left coding block can carry out inter prediction by using spatial merging candidates derived from the spatial merging candidate blocks derived with respect to the position of the top-left coding block.

A temporal merging candidate can be derived based on the position of a particular-sized block in the same way as a spatial merging candidate. The temporal merging candidate determines an available block in the order of H0, H1, H2, H3, and H4 block; and incorporates the available block into a merging candidate list for later use. The temporal merging candidate can be scaled and used according to the picture number of a reference picture. The temporal merging candidate can utilize not only the blocks at the boundary of a block X' corresponding to FIG. 21 but also the blocks M, N, O, P, Q located inside the block.

Figure 22:
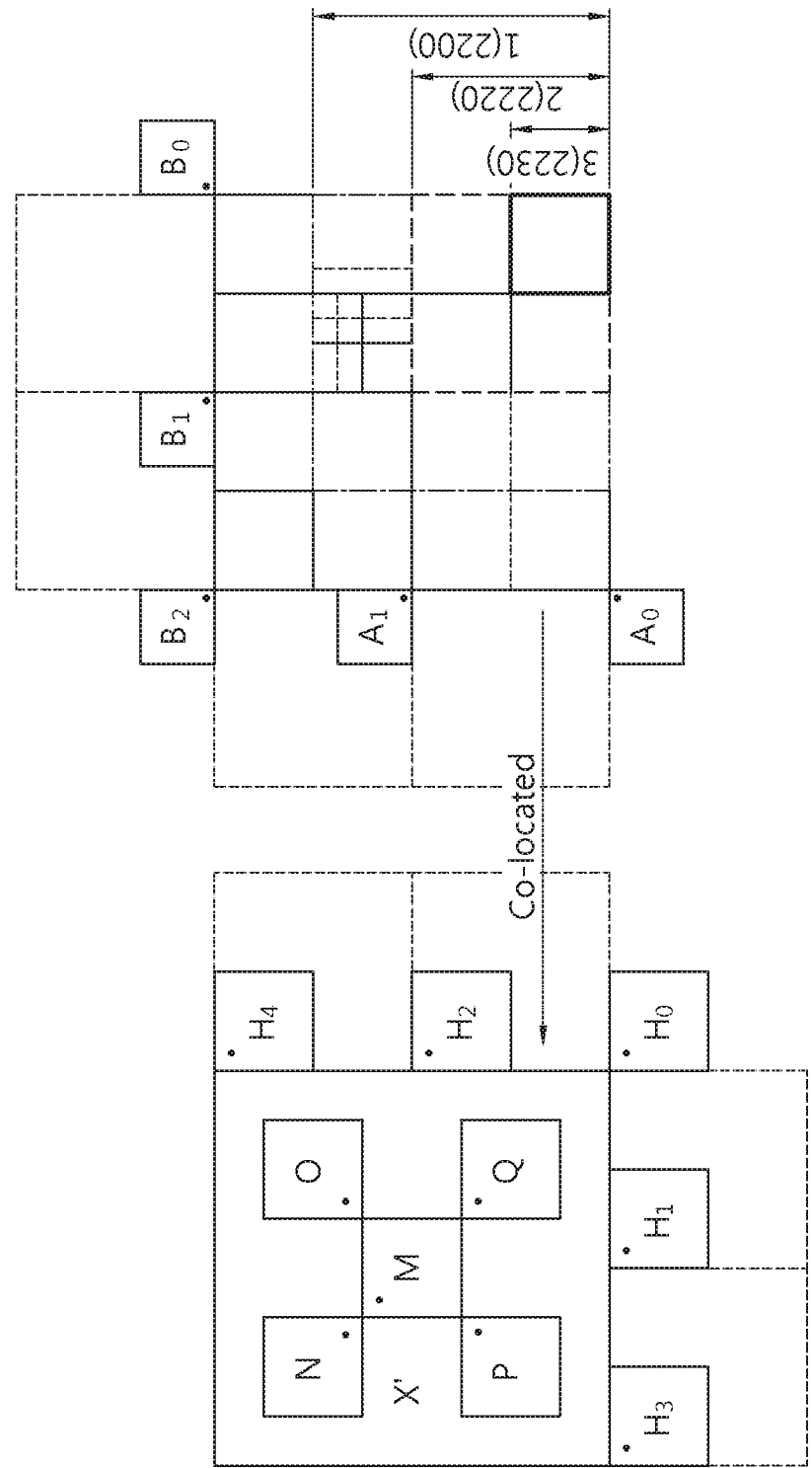
FIG. 22 is a conceptual drawing illustrating a position of a spatial merging candidate according to a division form of a coding block according to an embodiment of the present invention.

FIG. 22 is a conceptual drawing illustrating a position of a spatial merging candidate according to a division form of a coding block according to an embodiment of the present invention.

In case of a coding block distant from a spatial merging candidate block with respect to the size of a particular block, FIG. 22 illustrates a method for generating a merging candidate list by using only temporal merging candidates instead of using spatial merging candidates derived from spatial merging candidate blocks derived based on the size of the particular block.

With reference to FIG. 22, for example, a merging candidate list can be generated by using only temporal merging candidates with respect to the blocks of the size specified as 1 2200. In other words, A block unit can be specified, with which a merging candidate list is generated by using only temporal candidates by a particular specifier.

A temporal merging candidate determines an available block in the order of H0, H1, H2, H3, and H4 block; and incorporates a temporal merging candidate derived from the available block into a merging candidate list for later use. The motion vector derived from the temporal merging candidate can be scaled and used according to the picture number of a reference picture. The temporal merging candidate can utilize not only the blocks at the boundary of a block X' corresponding to FIG. 22 but also the blocks M, N, O, P, Q located inside the block.

The methods described above all can have a different application range according to the size or depth of a coding block. A parameter determining the application range (namely, block size information or block depth information) can be set up such that an encoder or a decoder uses a predetermined value or a value determined according to a profile or a level of a video encoding method. Also, if an encoder encodes a parameter value into a bit stream, a decoder may obtain the value from the bit stream for later use.

When there is needed to differentiate the application range according to the depth of a coding block, the following classification may be applied as shown in Table 6: A) a method applicable only for a depth more than a predetermined value, B) a method applicable only for a depth less than the predetermined value, and C) a method applicable only for a given depth.

In case the depth of a coding block is 2, Table 6 illustrates an example of a method for determining an application range of A), B), and C) method (where 0 indicates applicability at the corresponding depth whereas 1 indicates non-applicability at the corresponding depth).

TABLE 6

| Depth of a coding block | Method A | Method B | Method C |
|---|---|---|---|
| 0 | X | O | X |
| 1 | X | O | X |
| 2 | O | O | O |
| 3 | O | X | X |
| 4 | O | X | X |

In case the methods of the present invention are not applied for the entire depth range, a flag such as parallel_merge_enabled_flag illustrated in Table 5 can be used to represent the corresponding case; or the corresponding information can be transmitted by being incorporated into the syntax element representing depth information to be applied. The case can be represented by signaling a value larger than the maximum depth value of a coding block by one as a depth value of the coding block representing the application range.

Figure 23:
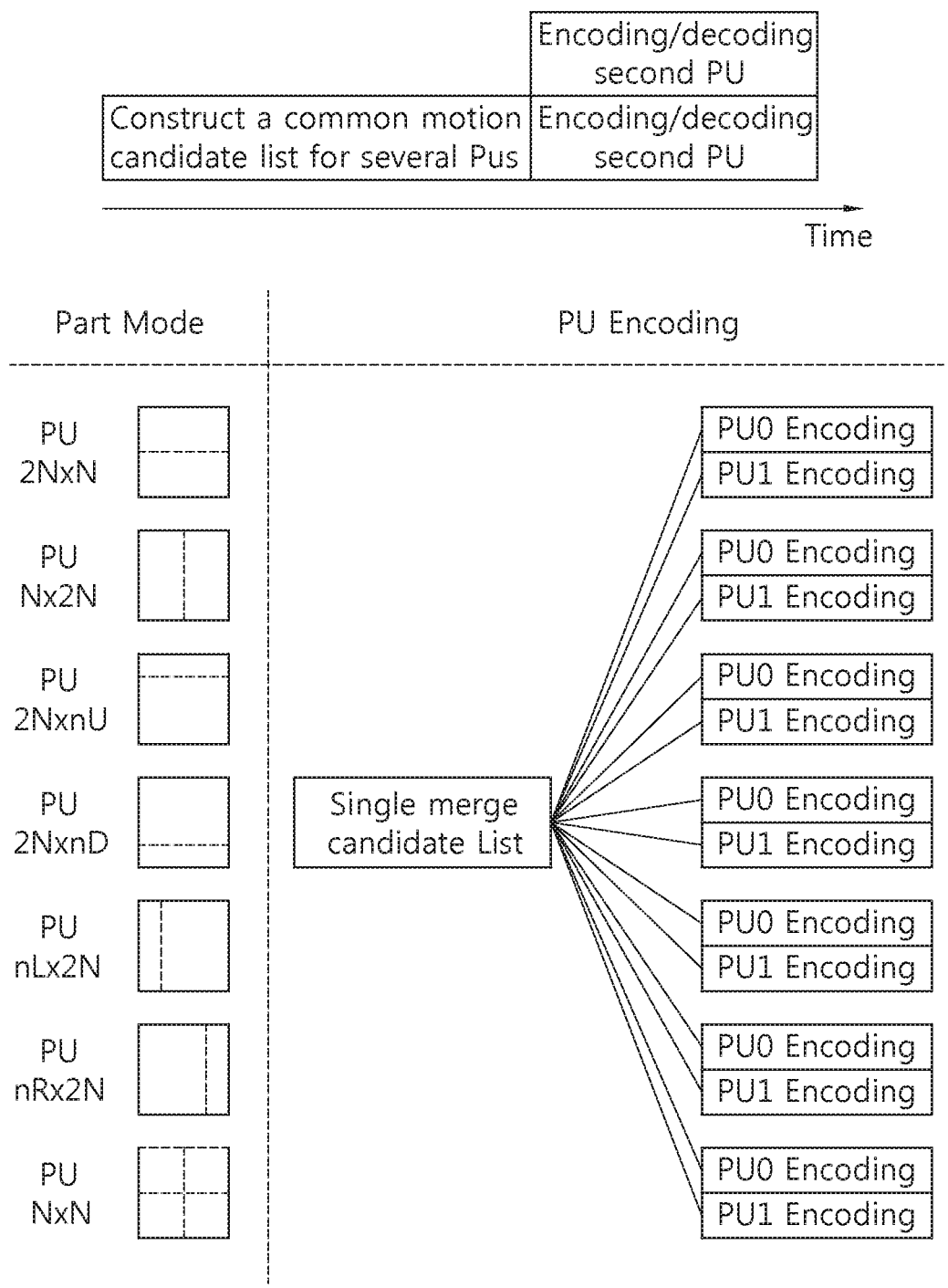
FIG. 23 is a conceptual drawing illustrating a procedure through which a plurality of prediction blocks are decoded and encoded in a parallel fashion when a method for generating a single candidate list according to an embodiment of the present invention is used.

FIG. 23 is a conceptual drawing illustrating a procedure through which a plurality of prediction blocks are decoded and encoded in a parallel fashion when a method for generating a single candidate list according to an embodiment of the present invention is used.

FIG. 23 assumes that one coding block is divided into two prediction blocks. For example, if the coding block satisfies particular conditions, parallel merge processing can be applied to the two prediction blocks included in the coding block by using a single merging candidate list. For example, if the size of the coding block is a particular value and is included in the size of a block to which parallel merge processing can be applied, inter prediction by merging can be carried out by deriving a spatial merging candidate and a temporal merging candidate with respect to the coding block. Such a method can be applied to various types of blocks.

FIG. 23 illustrates a case where encoding is carried out by using a single merging candidate list for a coding block divided into various forms. As shown in the figure, one coding block can be divided into various types of blocks. The divided prediction blocks can share a merging candidate list and carry out inter prediction by merging in a parallel fashion by using the shared merging candidate list. In other words, parallel encoding is possible for a plurality of prediction blocks included in one coding block. The method above can also be applied to decoding.

By using the method above, complexity due to generation of a merging candidate list for each of prediction blocks can be reduced and at the same time, video processing speed can be increased. In case of high resolution videos such as UHDTV, parallel processing is important in carrying out video processing. By using the method of the present invention, video processing in a parallel fashion is made possible.

The video encoding and decoding method described above can be implemented in each constituting unit of the video encoder and the video decoder described in FIGS. 1 and 2.

Although the present invention has been described with reference to preferred embodiments, it should be understood by those skilled in the art that the present invention can be modified and changed in various ways without departing from the technical principles and scope of the present invention defined by the appended claims.

What is claimed is:

1. A method for decoding a video signal comprising:
dividing a current block into a first sub-block and a second sub-block;
determining, based on a size of the current block, whether the first sub-block and the second sub-block share a single merging candidate list;
deriving, when the first sub-block and the second sub-block share the single merging candidate list, at least one merging candidate relating to the first sub-block based on a pixel position and the size of the current block; and
generating a first merging candidate list for the first sub-block based on the merging candidate,
determining motion information of the current block based on the first merging candidate list; and
obtaining prediction samples of the current block by using the motion information, and
wherein the whether the first sub-block and the second sub-block share the single merging candidate list is determined based on a result of comparison the size of the current block and a predetermined size.

2. The method of claim 1, wherein the predetermined size is 8×8.

3. The method of claim 1, wherein the current block is a coding block.

4. The method of claim 1, wherein the current block includes at least one coding block.

5. A method for encoding a video signal comprising:
determining motion information for a current block, the current block comprising a first sub-block of the current block and a second sub-block of the current block;
obtaining prediction samples of the current block;
obtaining residual samples of the current block by using the prediction samples of the current block;
determining, based on a size of the current block, whether the first sub-block and the second sub-block share a single merging candidate list;
deriving, when the first sub-block and the second sub-block share the single merging candidate list, at least one merging candidate relating to the first sub-block based on a pixel position and the size of the current block;
generating a first merging candidate list for the first sub-block based on the merging candidate; and
encoding the residual samples of the current block, and
wherein the whether the first sub-block and the second sub-block share the single merging candidate list is determined based on a result of comparison the size of the current block and a predetermined size.

6. The method of claim 5, wherein the predetermined size is 8×8.

7. The method of claim 5, wherein the current block is a coding block.

8. The method of claim 5, wherein the current block includes at least one coding block.

9. A non-transitory recording medium storing a bitstream formed by a method for encoding a video signal, the method comprising:
determining motion information for a current block, the current block comprising a first sub-block of the current block and a second sub-block of the current block;
obtaining prediction samples of the current block;
obtaining residual samples of the current block by using the prediction samples of the current block;
determining, based on a size of the current block, whether the first sub-block and the second sub-block share a single merging candidate list;
deriving, when the first sub-block and the second sub-block share the single merging candidate list, at least one merging candidate relating to the first sub-block based on a pixel position and the size of the current block;
generating a first merging candidate list for the first sub-block based on the merging candidate; and
encoding the residual samples of the current block, and
wherein the whether the first sub-block and the second sub-block share the single merging candidate list is determined based on a result of comparison the size of the current block and a predetermined size.

10. The recording medium of claim 9, wherein the predetermined size is 8×8.

11. The recording medium of claim 9, wherein the current block is a coding block.

12. The recording medium of claim 9, wherein the current block includes at least one coding block.

* * * * *